(12) United States Patent
Oattes

(10) Patent No.: US 12,481,648 B2
(45) Date of Patent: Nov. 25, 2025

(54) SYSTEMS AND METHODS FOR GENERATION AND DISPLAY OF QUERY VISUALIZATIONS

(71) Applicant: Kobai, Inc., San Ramon, CA (US)

(72) Inventor: Ryan Oattes, Burlington (CA)

(73) Assignee: Kobai, Inc., San Ramon, CA (US)

( * ) Notice: Subject to any disclaimer, the term of this patent is extended or adjusted under 35 U.S.C. 154(b) by 86 days.

(21) Appl. No.: 17/552,227

(22) Filed: Dec. 15, 2021

(65) Prior Publication Data

US 2023/0185797 A1    Jun. 15, 2023

(51) Int. Cl.
*G06F 16/242* (2019.01)
*G06F 16/28* (2019.01)

(52) U.S. Cl.
CPC ........ *G06F 16/2423* (2019.01); *G06F 16/287* (2019.01)

(58) Field of Classification Search
CPC ..... G06F 16/2423; G06F 16/287; G06F 16/25
See application file for complete search history.

(56) References Cited

U.S. PATENT DOCUMENTS

| | | | | |
|---|---|---|---|---|
| 9,280,612 | B2* | 3/2016 | Hao | G06F 16/285 |
| 9,928,296 | B2* | 3/2018 | Li | G06F 40/242 |
| 10,657,687 | B2 | 5/2020 | Menard et al. | |
| 11,055,358 | B1 | 7/2021 | Guha et al. | |
| 11,138,286 | B2* | 10/2021 | Birch | G06F 18/2115 |
| 2010/0095353 | A1* | 4/2010 | Athsani | G06F 21/10 726/4 |
| 2013/0166585 | A1* | 6/2013 | Das Sarma | G06F 16/3322 707/E17.014 |
| 2016/0034553 | A1 | 2/2016 | Tong et al. | |
| 2016/0225271 | A1* | 8/2016 | Robichaud | G06F 16/22 |
| 2016/0342604 | A1* | 11/2016 | Link | G06T 11/206 |
| 2018/0173754 | A1 | 6/2018 | Kumar | |
| 2018/0329909 | A1* | 11/2018 | King, III | G06F 16/358 |
| 2019/0102390 | A1* | 4/2019 | Antunes | G06F 40/295 |
| 2019/0324968 | A1* | 10/2019 | Kelly | G06N 20/00 |
| 2019/0347181 | A1 | 11/2019 | Cranfill et al. | |
| 2020/0117658 | A1 | 4/2020 | Venkata et al. | |
| 2020/0125559 | A1* | 4/2020 | Talbot | G06F 3/0486 |
| 2020/0201928 | A1* | 6/2020 | Wang | G06F 16/9574 |
| 2020/0210857 | A1 | 7/2020 | Goradia et al. | |

(Continued)

OTHER PUBLICATIONS

"Metaphacts", metaphacts GmbH. (n.d.). Metaphacts. https://metaphacts.com/.

(Continued)

*Primary Examiner* — Marc S Somers
*Assistant Examiner* — Fernando M Mari Valcarcel
(74) *Attorney, Agent, or Firm* — Haley Guiliano LLP

(57) ABSTRACT

Systems and methods for generating and filtering visualizations are disclosed herein. In an embodiment, a DPA provides a graphical user for defining a query, including specifying semantic classes and attributes of the query. The DPA further provides options for generating a visualization from the query results and for adding the visualization to a collection of visualizations. The DPA recommends collections for the visualization to be added to based on queries of the collections sharing semantic classes, attributes of the classes, and/or aggregates of attributes with the query from which the visualization is being generated.

20 Claims, 12 Drawing Sheets

(56) References Cited

U.S. PATENT DOCUMENTS

2021/0224299 A1\* 7/2021 Karlapalem .......... G06F 16/287
2023/0185818 A1 6/2023 Oattes

OTHER PUBLICATIONS

U.S. Appl. No. 17/552,220, filed Dec. 15, 2021, Ryan Oattes, et al.
International Search Report and Written Opinion of PCT/US2022/081654 dated Mar. 29, 2023.
Steinberger et al., "Context-Preserving Visual Links", IEEE Transactions on Visualization and Computer Graphics, IEEE, USA, vol. 17, No. 12 pp. 2249-2258 (2011).

\* cited by examiner

SYSTEMS AND METHODS FOR GENERATION AND DISPLAY OF QUERY VISUALIZATIONS

BACKGROUND

This disclosure relates to generating, displaying, and filtering of visualizations generated from query results.

SUMMARY

Visualization of query results can be extremely valuable in understanding large amounts of stored data. Query visualization engines will often include options for specifying data to be selected from a data store in addition to a means for presenting the data, such as through a table, chart, or graph. For instance, results of a query (e.g., an SQL query) of a datastore for an school system may be used to generate a visualization that identifies attendance rates for schools over a period of time, such as a week.

While query visualizations can be extremely useful, each query visualization is often treated independently from the other query visualizations. Once a query visualization is prepared, it is often a static product that has no relationship to other query visualizations. For instance, for two visualizations to appear on the same dashboard, a user may define an interface that depicts both query visualizations. The functionality of that interface is merely to display the query results. While such a query interface is valuable for displaying multiple graphs, the lack of functionality of the system with respect to understanding of the queries and their relationships means that modifying filters in such an interface can be extremely labor intensive. For instance, if a user wishes to apply filters to different visualizations, the user would have to individually select each graph and apply the filters or identify the data retrieved in response to each of the queries and individually apply the filters to each set of retrieved data. When the number of interfaces and visualizations are increased, the task of generating new interfaces or identifying which interfaces should include which query visualizations becomes daunting. Changing the query visualization often would require sending new queries to a data source and updating each query individually, additionally using a greater amount of network resources, memory, and a higher number of interactions with the interface to achieve a desired result.

To overcome the deficiencies of query visualization interfaces, methods and systems are described herein for determining relationships between query visualization interfaces and between different queries that are visualized on said interfaces. The relationships can then be used to provide intelligent interface navigation tools, to provide filters to a visualization interface, and to recommend queries to be displayed in different interfaces. The system stores data identifying semantic classes and attributes of each query that was used to generate an interface as well as any filters that are defined based on the attributes. The interface can then be generated to include the filters that are mapped to the query visualizations that are displayed on the interface.

In an embodiment, an interface for defining a visualization for the pre-defined query includes options for selecting a type of visualization, such as a graph or chart, and options for specifying which of the semantic classes are used to build the visualization. In the aforementioned example of the attendance rate query, a semantic class used to build the visualization include the student semantic class. Additionally, the interface may include options for selecting filters from the other semantic classes or attributes of the semantic classes defined for the query, such as a filter based on grade level. The interface may additionally include options for specifying one or more collections to which the visualization will belong.

When generating the interfaces, the system solves the deficiencies of previous methods in navigating through other interfaces by identifying query visualizations that are stored in different collections. Thus, if a first visualization of a query is stored in both a "monthly revenue" collection and in an "employee scheduling" collection, then the system may recommend navigation to the "employee scheduling" collection while the "monthly revenue" collection is being viewed.

When displaying queries on the interface, the system solves the deficiencies of previous methods in query visualization augmentation by providing filters that were generated with the initial queries. The system identifies filters that have been identified for the different visualizations and provides an option to filter the visualizations by the filter. When a filter is selected, the system filters the results of each of the queries that were used to generate a visualization and updates the visualizations based on the filtered query results. The system is additionally able to identify visualizations that do not have the filters assigned to their corresponding queries and remove those visualizations or recommend updating the queries to include those filters. For example, a first query visualization may comprise a graph of average employee salaries over a plurality of years and a second query visualization may comprise a graph of revenue over a plurality of years. When a particular location filter is selected, both graphs may be filtered to only data from that location. Alternatively, a third query visualization may comprise a graph of number of types of products provided by a company over the plurality of years. As the number of types of products does not vary by location, a location filter may not be applicable. Thus, when the particular location filter is selected, the visualization may be removed from the interface.

When queries are generated, the system solves the deficiencies in providing visualizations in useful interfaces by recommending collections to include the query based on the semantic classes defined in the query. For instance, the system stores each of the queries used to generate a visualization and is able to identify, for each collection, semantic classes that are common in queries in that collection. The system is also able to identify semantic classes that are generally common in queries, such as location and cost. When a new query is generated, the system identifies the generally common semantic classes and the semantic classes that are not generally common. For those that are not generally common, the system identifies collections in which the semantic classes are more common. The system then recommends display of a visualization of the query in the identified collections.

DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
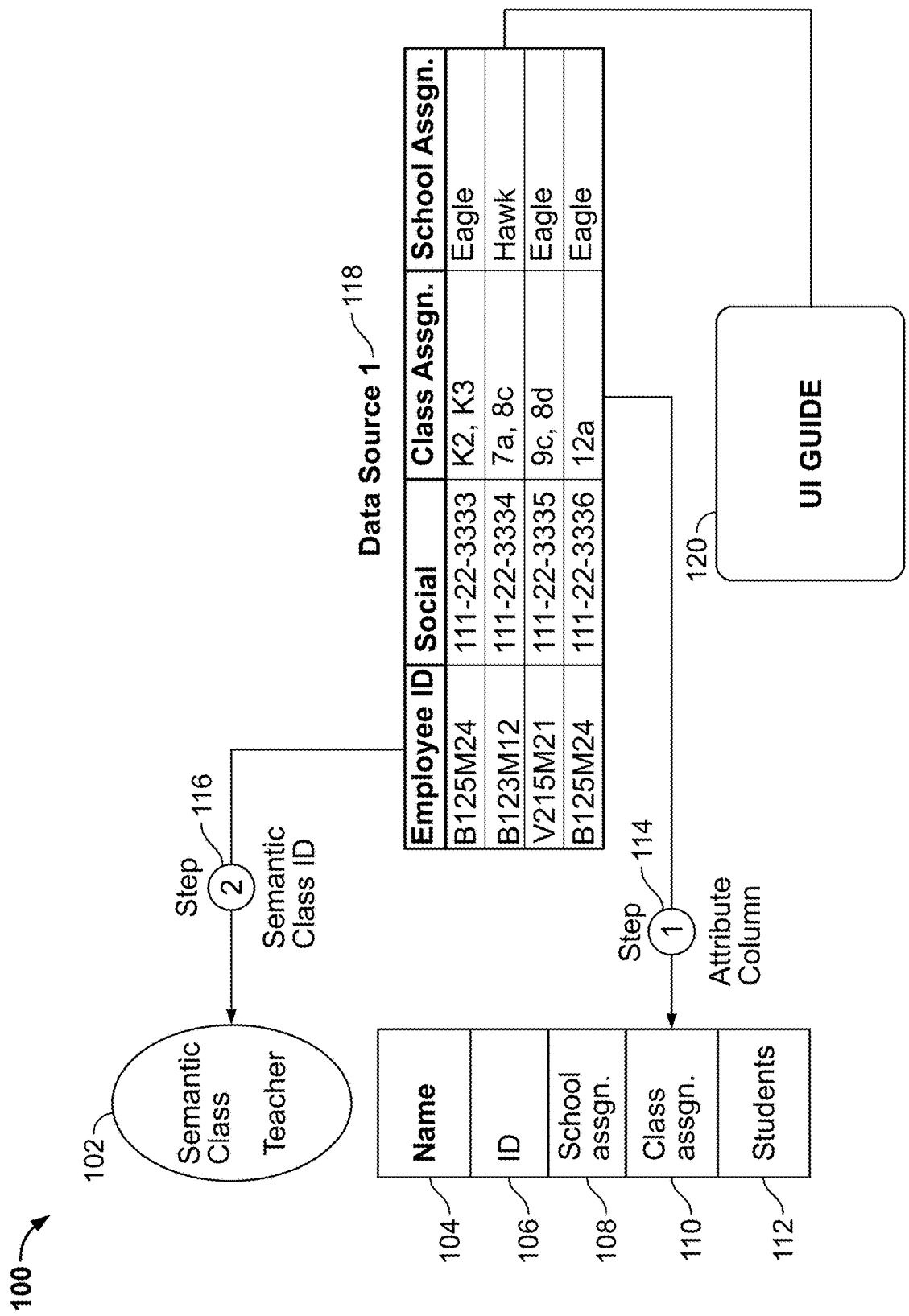
FIG. 1 shows an illustrative mapping process for creating a semantic overlay data structure, in accordance with some embodiments of the disclosure.

FIG. 1 shows an illustrative mapping process 100 for creating a semantic overlay data structure, in accordance with some embodiments of the disclosure. In some embodiments, the mapping process may be performed by a Data Processing Application (the DPA). In one approach, the DPA is embodied in a set of instructions stored in non-volatile memory of a single server or in a set of servers acting in parallel (e.g., in a distributed computing environment). The processors of the server or servers execute the intrusions stored in non-volatile memory to enable the operation of the DPA. The DPA may interface with data stored locally or on a remote device or devices accessible via at least one network.

The systems and methods performed by the DPA described herein generate and use a semantic overlay data structure (which may also be referred to as a semantic model) that provides a level of abstraction for traditional data sources (e.g., tables, database, lists) such as first data source 118. The method of creating overlay data structures is described in more detail in the '857 Publication. For example, first data source 118 may comprise a table listing data for teachers in a school district. As shown, first data source 118 includes several columns for multiple teachers, such as social security number, class assignment, school assignment, etc. One skilled in the art would appreciate that such a table may include any suitable number of columns tracking any suitable data for teachers in the school districts. In some embodiments, rows may be used to track data instead of or in addition to columns.

The DPA may operate to ingest first data source 118 (and any other traditional data sources) into a semantic overlay data structure. The semantic overlay data structure may define a plurality of semantic classes (e.g., "teacher," "school," "student"). Some exemplary semantic classes are further shown, e.g., in FIG. 3 of the present disclosure. Each semantic class may comprise a list of attributes. For example, the semantic class "teacher" 102 may comprise a name attribute 104, ID attribute 106, school assignment attribute 108, class assignment attribute 110, and students attribute 112. One or more of the attributes may be connection to other semantic classes. For example, the "students" attribute 112 may be a link to one or more semantic classes' instances of the semantic class "Student" (e.g., by linking to an ID of those instances). Similarly, the "school assignment" attribute 108 may be a link to one or more semantic classes' instances of the semantic class "School." The semantic overlay data structure may be defined and stored as a graph data structure that identifies every semantic class in the model and indicates all connections between the semantic classes (e.g., as edges between nodes of a graph). The semantic overlay data structure may also define the list of attributes for every semantic class (e.g., as data stored in association with each node of the data structure). The semantic overlay data structure may be incrementally defined using User Interface (UI) Guide 120 (e.g., as further described in the '857 Publication). For example, the user interface input from UI guide 120 may create a number of nodes, name the nodes, and draw connections between the nodes. The user interface input from UI guide 120 may then be used to define attributes for each node (e.g., by clicking a node and inputting names of the attributes).

Each semantic class in the model may be associated with multiple instances of that semantic class. For example, as shown, four instances of semantic class "teacher" 102 may be created by the system based on four teachers being listed in the first data sources. Advantageously, instances of semantic class "teacher" 102 may also be created based on any number of traditional data sources. Each instance of semantic class "teacher" 102 may be assigned a semantic class instance ID. Such instance ID may be used by the search system to uniquely identify each class instance. Because instance ID uniquely identify each class instance such IDs may further be used to create unique links between semantic class instance (e.g., a link from an attribute may be defined to point to another semantic class instance, for example by storing ID of the linked semantic class instance as one of the attributes).

Once the structure of the semantic overlay data structure is defined, data from one or more data sources (e.g., first data source 118) may be ingested into the semantic overlay data structure (e.g., to create sematic class instances for each defined sematic class). The ingestion process may be assisted using UI guide 120. For example, items in columns of first data source 118 are mapped to semantic class attributes 104-112. The user device that interfaces with the DPA may be prompted by UI guide 120 to perform the mapping. For example, UI Guide 120 may guide selections of data for attributes of semantic class 102. FIG. 1 illustrates an exemplary 2-step data mapping using UI guide 120. In one example, first step 114 corresponds to a selection of at least one column from a data source 118 (e.g., class assignment column) to provide attribute values for a selected attribute (e.g., attribute 110). Second step 116 corresponds to identifying the appropriate semantic class and appropriate attribute for the that class that is to be mapped to that column. Steps 114 and 116 may be performed in any order or at the same time.

In another alternative approach, the data is ingested from one or more data sources (e.g., first data source 118) into the semantic overlay data structure only when a query is received. In this approach, the sematic classes, attributes, and connections between the sematic classes may be defined ahead of time, however the actual instances of the classes may be generated in real time when required (e.g., when a query if formed, such as at element 304 of FIG. 3). In some embodiments, a hybrid approach may be used, e.g., some data sources may be ingested ahead of time, while other data is ingested as needed.

For example, the illustrated example shows a mapping of "Class Assignment" attribute 110 in the semantic overlay data structure to the "Class Assgn" column in the Data Source 118 source table. In this example, a user interface can be used to drag "Class Assignment" attribute 110 over the "Class Assgn" Column of Data Source 118. In one embodiment, the user interface displays a prompt to identify how Data Source 118 relates to the semantic class "Employee" 102 in the overlay data structure. For example, the user interface may generate a prompt to indicate how each employee is uniquely identified in Data Source 118. In this case, the "Employee ID" column may be selected as unique identifier of Sematic Classes "Teacher" instances (which may match "ID" attribute 104). In this way columns of the first data source 118 may be mapped to attributes of instances of semantic class 102. One skilled in the art would appreciate that this process may be performed for any number of data sources and for any attributes of any number of defined semantic class. For example, different columns of many different data sources may be mapped to attributes of semantic classes "teacher," "school," and "student." In some embodiments, multiple columns of multiple data sources are mapped to the same attribute of the same semantic class. In some embodiments, the mapping may also define relations to other instances of other semantic classes. For example, the attribute "school assignment" may be mapped to instances of a semantic class "school" when a connections is defined between semantic class "teacher" and semantic class "school."

In some embodiments, the ingestion of data from first data source 118 to the semantic overlay data structure that includes semantic class 102 is accomplished by the DPA creating and updating a triplestore purpose-built database for the storage and retrieval of data through semantic queries. For example, the DPA may create triples (which may also be referred to as "triads" or "3-tuples") based on ingestion of data. For example, triples (e.g., triples suitable for SPARQL Protocol and RDF Query Language (SPARQL)) may include, for each instance of an attribute: the name of the attribute, the type of connection, and data for that attribute. The triples may then be indexed and used for fast data retrieval. For example, the triples may be data triples defined by W3C RDF 1.1 N-Triples specification (https://www.w3.org/TR/n-triples/) which is herein incorporated into this document in its entirety.

Figure 2:
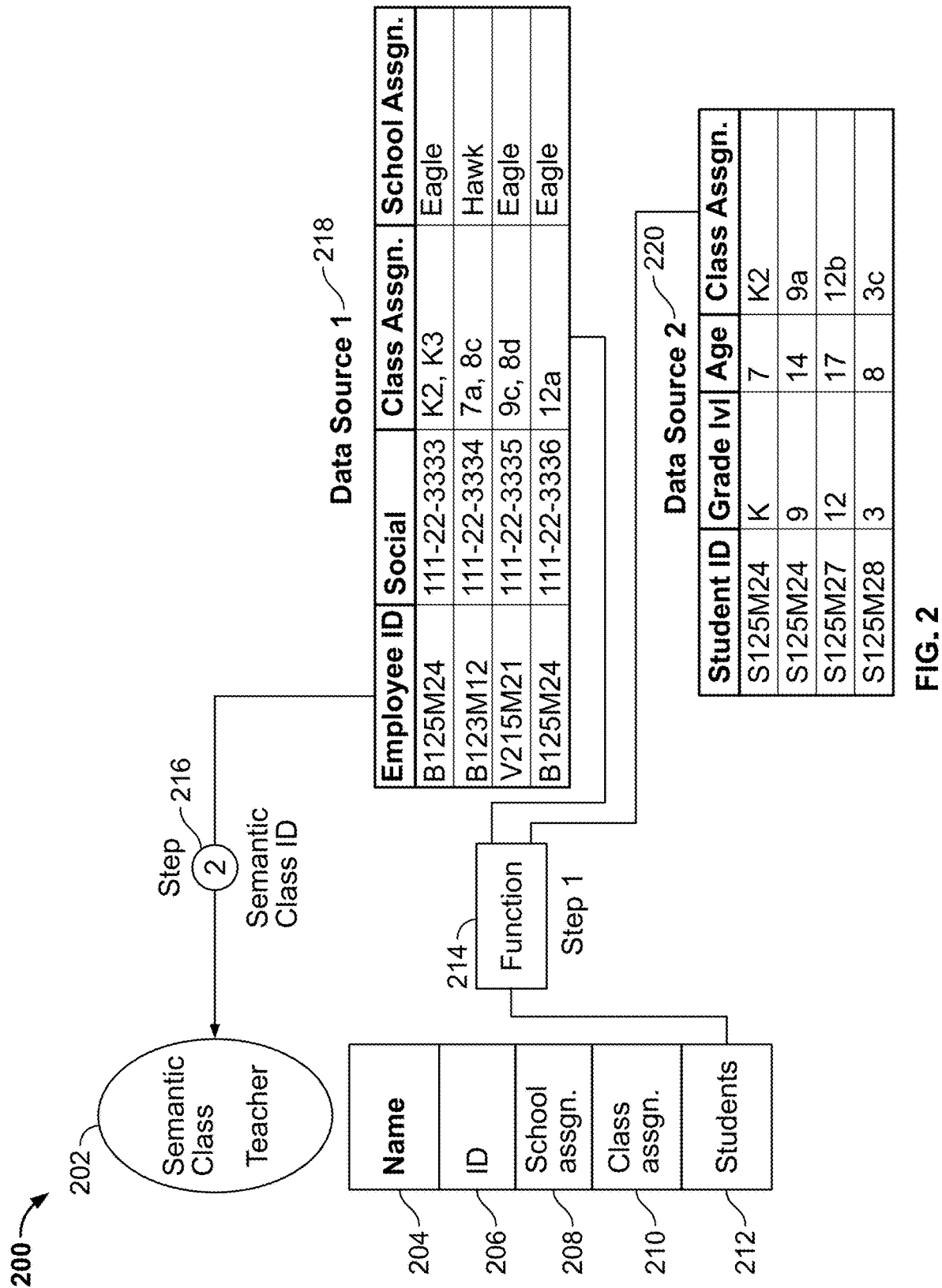
FIG. 2 shows another illustrative mapping process for creating a semantic overlay data structure, in accordance with some embodiments of the disclosure.

FIG. 2 shows another illustrative mapping process 200 for creating a semantic overlay data structure, in accordance with some embodiments of the disclosure. In some embodiments, the mapping process may be performed by the DPA. In some embodiments, semantic class 202 is the same as semantic class 102, and data source 218 is the same as data source 118.

In the shown embodiment, an inputted function 214 may be used to leverage more than one column of more than one data source to ingest data for the attribute "students" 212. For example, the DPA may adapt source fields in data sets 218 and 220 into the proper format to suit ingestion into a semantic overlay data structure. The ingestion by the DPA may be performed as 2 steps of a process (e.g., using a UI guide 120). In particular, step 1 may correspond to a selection of a semantic class and related attribute while step 2 corresponds to defining function 214 and selection of data sources for function 214. For example, function 214 may join or cross references information from different source tables in accordance with an embodiment. In the shown example, function 214 may compare class assignment for teachers from data source 218 and class assignment for students from data source 220 to create a list of teachers who study under a particular teacher. The result of the cross references can then be ingested by the DPA as list of students (or as SPQRL triples) reflecting which student studies with which teacher. Alternatively, the DPA may also search already ingested instances of semantic class "student" and add links to IDs of the matching instances to attribute "students" 212. One skilled in the art would appreciate that any suitable function may be used to transform any number of data from any number of data sources to define any attribute in semantic class 202 or in any other semantic class.

Figure 3:
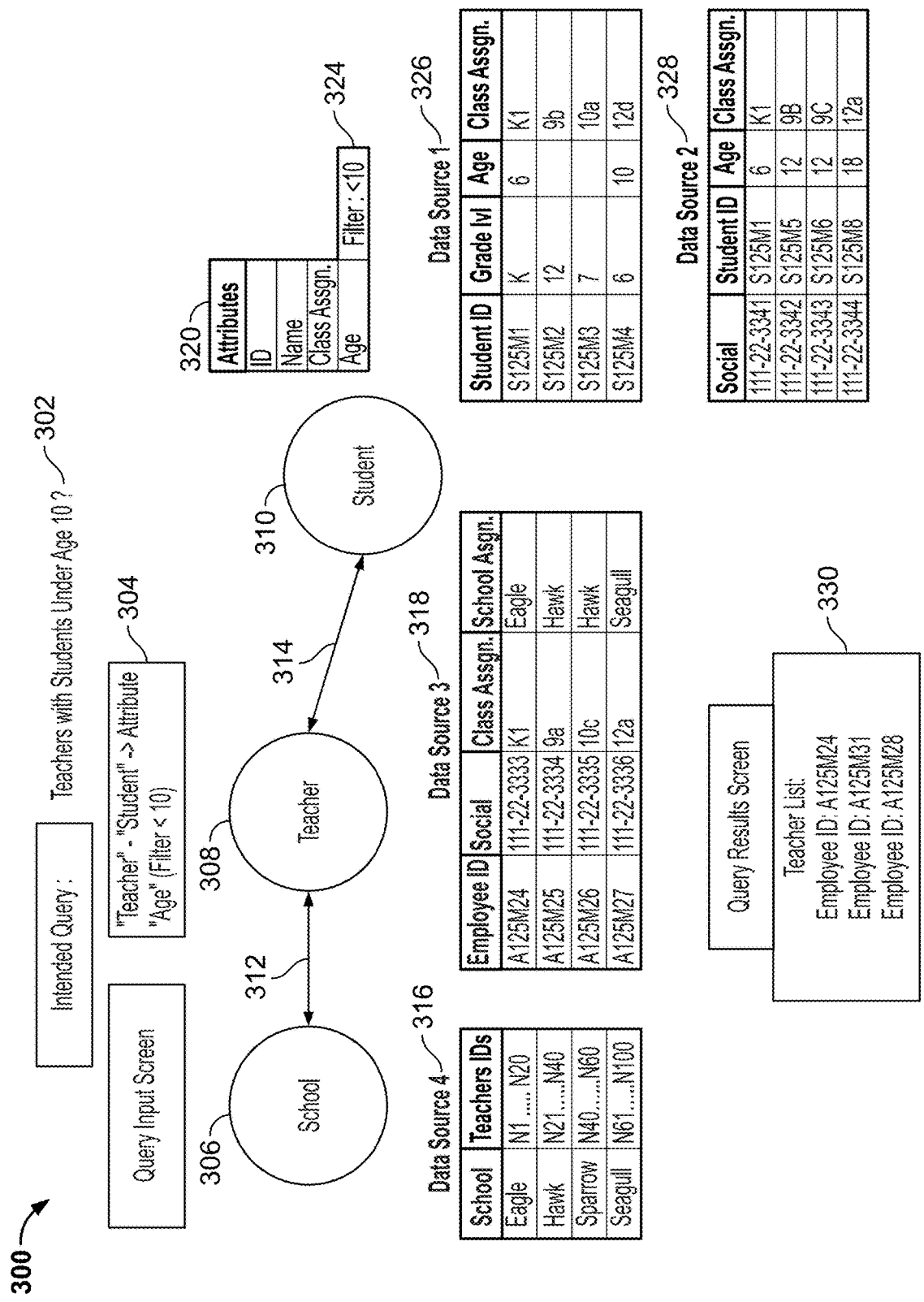
FIG. 3 shows an example of using query visualization, in accordance with some embodiments of the disclosure.

FIG. 3 shows an example of using query visualization 300, in accordance with some embodiments of the disclosure. Query visualization 300 shows an exemplary visualization of a query defined using a semantic overlay data structure that was defined using techniques described in FIGS. 1 and 2. For example, the DPA may have been used to define a semantic overlay data structure based on data sources 326, 328, 318, 316, e.g., to define a plurality of semantic classes (e.g., 306, 308, 310) using techniques described in FIGS. 1 and 2 and in the '857 Publication.

For example, the semantic overlay data structure may define semantic class "school" 306, semantic class "teacher" 308, and semantic class "student" 310. The semantic class "school" 312 may be linked to semantic class "teacher" 308, and semantic class "teacher" 308 may be linked to semantic class "student" 310. The semantic overlay data structure may also include any other number of additional semantic classes and connections. Each of the of semantic classes 306, 308, 310 may include its own list of attributes. For example, the semantic overlay data structure may store attributes 320 for semantic class "student" 310. The DPA may have similarly populated attributes 320 with data from one or more of data sources 326 and 328. For example, the attribute "Age" may have been mapped to column 3 of data source 326 and to column 3 of data source 328 using techniques described in FIGS. 1 and 2 and in the '857 Publication. Similarly, attributes for semantic class 308 may have been populated using data of data source 318 and any other data sources. Similarly, attributes for semantic class 306 may have been populated using data of data source 316 and any other data sources.

Once the data for semantic classes 306, 308, 310 is ingested by the DPA, a user interface (e.g. UI 120 of FIG. 1) may be used to enter a query. For example, the intent 30 of a query may be to find teachers (e.g., in all schools) who teach students under 10 years of age. User interface element 304 may be used to construct a search query that relies on the semantic overlay data structure. Advantageously, the search can be constructed using intuitive input rather than constructing an SQL query that needs to access all of data sources 316, 318, 326, 328. Instead, user interface 304 receives input that identifies semantic class "teacher" 306, and related semantic class "student." Optionally user interface 304 receives data that includes an indication of semantic class "school" 306. In some embodiments, user interface 304 may also be used to input a filter for some or all attributes of inputted semantic classes. For example, user interface 304 may be used to define a filter for attribute age being less than 10. In some implementations, the input of semantic classes, attributes, and filters may be entered sequentially resulting in sequential changes in visualization 300 (for example identifiers of semantic classes may appear when the associated semantic classes are added to the query). In some embodiments, the query may be converted by the DPA into triples-based query language (e.g., SPARQL) that may operate over the triples (e.g., triples compatible with the SPARQL queries) created during the data ingestion as described above.

The DPA may be used to construct visualization shown in FIG. 3. For example, the DPA may generate for display identifiers (e.g., circles) for each of the semantic classes 306, 308, 310 and connections 312 and 314 between classes. The visualization may be transmitted for display to a remote user device (e.g., the same device that provided UI input via screen 304). For example, the visualization may be based on the previously constructed overlay data structure that, in turn, abstracts information from data sources 316, 318, 326, and 328 (e.g., by converting traditional tabular data into a set of semantic triples). The DPA may search the set of generated sematic triples (e.g., using SPARQL queries) for data that matches the defined input and generate for display (e.g., by transmitting to a user device) results 330 that list ID's of teachers that teach students under the age of 10.

In one approach, after input is received (e.g., via input 304) the DPA automatically (e.g., without user interface input explicitly requesting the analysis) begins to compute statistic scores for all data sources that were used by the DPA during ingestion of data for semantic classes, connections, and attributes referenced by the query. For example, the DPA may begin analyzing data sources 316, 318, 326, 328 to compute statistic scores. The DPA may also compute statistic scores for each referenced semantic class and attribute. Exemplary techniques for computing the statistic scores are described in FIGS. 4-6. In another approach, the statistical analysis may begin in response to user interface input requesting analysis, e.g., a button press may be received on a button labeled "check for problems" or "troubleshooting." In some embodiments, the user interface input for requesting analysis may be generated for display by the DPA based on preliminary statistical analysis. For example, the user interface input for requesting problem analysis may appear if the number of results 330 is zero or very low (e.g., if less than 5% of total teachers are shown) or if it's very high (e.g., if more than 95% of total teachers are shown) which indicates, for example, that there is either not enough data or the filter is not functioning properly.

In another approach, the statistic scores may have been pre-computed, e.g., at the time of data ingestion. In one approach, statistic scores may have been calculated (and stored) during the process of construction of modification of the semantic model, e.g., during ingestion of data sources depicted in FIGS. 1 and 2. For example, the DPA may have computed the statistic scores for data sources 118, 218, 220, for sematic classes 102 and 202, for attributes 104-112 and 204-21, and for combinations of attributes and data sources. The statistic scores may have been stored by the DPA such that they are easy to retrieve (e.g., each semantic class and each attribute may be linked to associated statistic scores).

In such embodiments, as the query is being constructed, the DPA simply access pre-computed statistic scores instead of calculating them. For example, the statistic scores may be accessed after the full query is entered, or gradually as the query is being constructed. Once accessed, the statistic scores may be used in the same way as newly computed scored described above.

Figure 4:
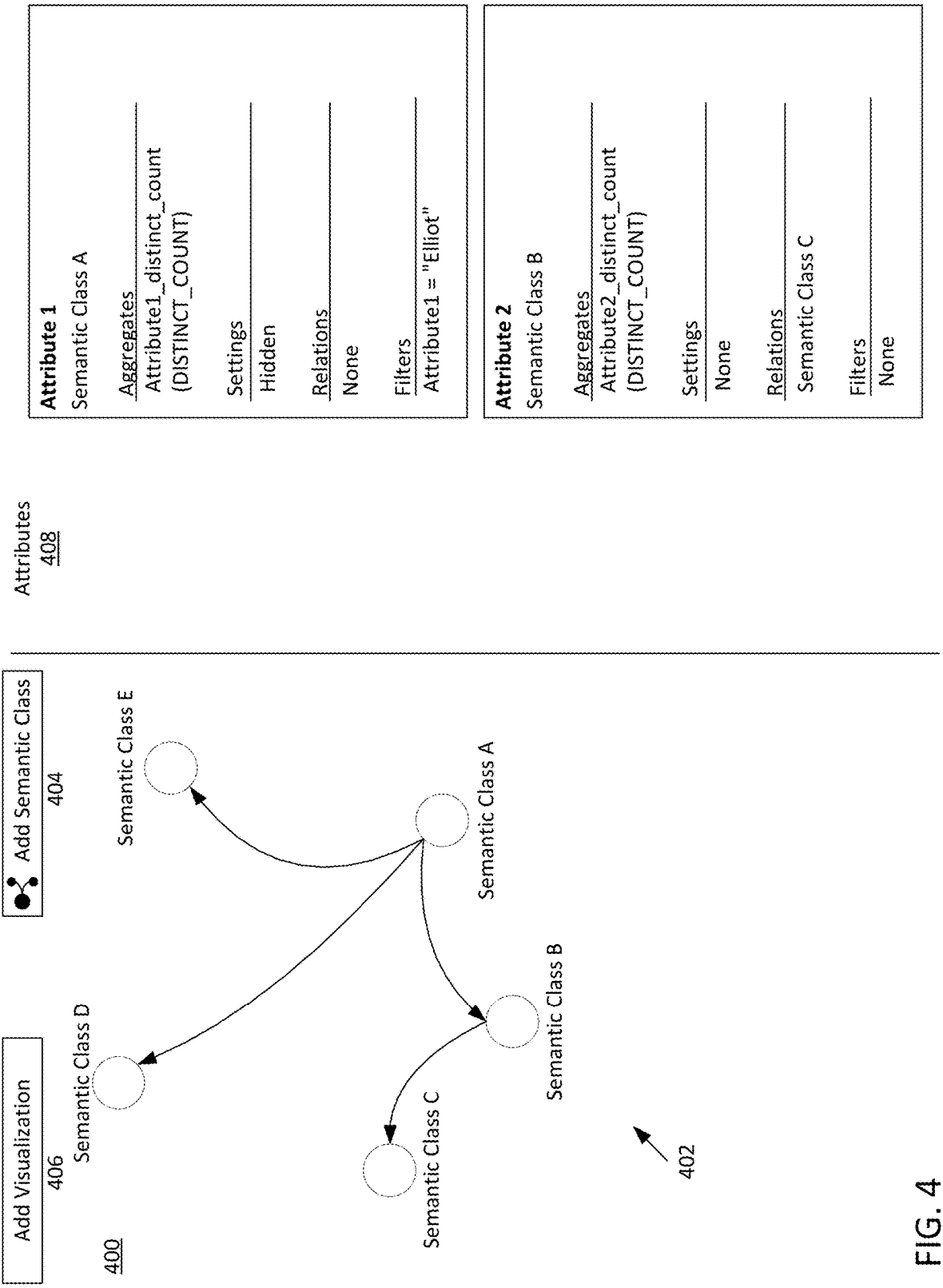
FIG. 4 depicts an example graphical user interface for generating a query comprising a plurality of semantic classes, in accordance with some embodiments of the disclosure.

FIG. 4 depicts an example graphical user interface for generating a query comprising a plurality of semantic classes. The graphical user interface may be provided to a client computing device by the DPA. In FIG. 4, a query generating interface 400 includes query graph representation 402, semantic class option 404, visualization option 406, and attribute definitions 408. Query graph representation 402 comprises a visual depiction of the semantic classes of a query and their relationships to other semantic classes of the query. The semantic class option 404 comprises a selectable interface element for selecting a new semantic class to be added to the query. When the semantic class option 404 is selected, interface 400 displays an interface through which a semantic class of the data can be selected to be added to the query. The option may further include an option to select one or more existing semantic classes of the query to which the new semantic class will be related.

The visualization option 406 comprises a selectable interface element for generating a visualization based on the query. When selected, the visualization option 406 comprises display of an interface with options for generating a visualization, the options including options for selecting attributes of the semantic classes of the query to visualize, options for selecting a type of visualization, options for selecting collections and/or filters for the visualization, and/or other options for defining the visualization as described further herein with respect to FIG. 5.

The attribute definitions 408 comprise a plurality of attributes of the semantic classes of the query that are to be retrieved when the query is run. The interface may include options (not shown) for specifying which attributes of the semantic classes to retrieve. The attribute definitions 408 additionally include user-defined details on how the attributes are to be obtained and used. For instance, attribute definitions 408 include aggregates, defining aggregations that are to be performed with the attributes, settings, defining whether the attributes are to be displayed, relations, defining relationships between the attributes and other semantic classes, and filters, defining attribute values by which query results may be filtered. In some embodiments, more or less elements for defining attributes may be displayed on the graphical user interface.

Figure 5:
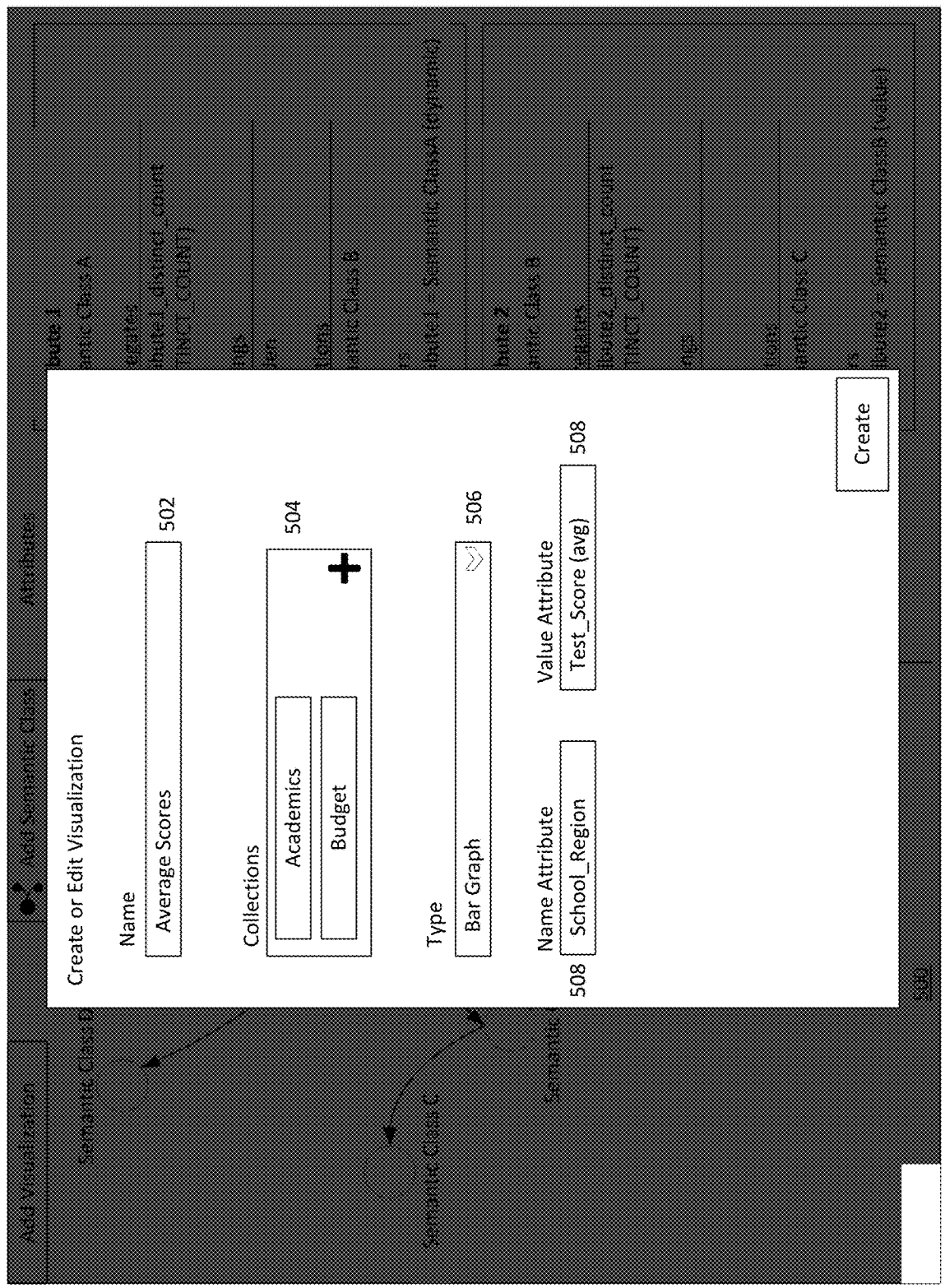
FIG. 5 depicts an example graphical user interface for generating a visualization from a query, in accordance with some embodiments of the disclosure.

FIG. 5 depicts an example graphical user interface for generating a visualization from a query, such as the semantic query generated through the graphical user interface of FIG. 4. The graphical user interface may be provided to a client computing device by the DPA. For instance, the "create or edit visualization" interface 500 may be displayed in response to a selection of the visualization option 404 in FIG. 4. In an embodiment, interface 500 incorporates elements from the query generated through the graphical user interface. The incorporated elements may include attribute information, semantic class information, query name, and/or other information generated as part of the query.

Interface 500 includes name field 502, collection field 504, visualization type 506, and attribute fields 508. Name field 502 comprises an editable field for entering a name for the visualization to appear on a graphical user interface along with the visualization. Collection field 504 comprises an option to specify one or more collections to include the visualization. A collection, as used herein, refers to a grouping of one or more visualizations to appear on a single graphical user interface as described further herein. Interface 500 may include options to select previously generated collections and/or generate new collections for the visualization. Type field 506 comprises an option to select a visualization type, such as a bar graph, scatter plot, pie chart, or other visualization. Attribute fields 508 comprise options for specifying attributes of the query used to generate the visualization. Options for attribute fields 508 may be populated from attributes in the initial query for which the visualization is being generated. Thus, in FIG. 5, the attributes of "School_Region" and "Test_Score (Avg)" may be attributes that were previously defined for the query, including any aggregates. For example, "Test_Score (Avg)" may comprise an average of test scores across different schools defined for the query.

Interface 500 depicts a limited number of elements for the purpose of providing a clear example. Other embodiments of an interface for generating a query may include other options, such as labels for axes, color options, etc. Some embodiments may additionally include an option to select which of the filters of the query to apply to the visualization.

In some embodiments, the DPA displays recommendations to add a visualization that is being generated to other collections. For example, the DPA may determine that two collections are related due to the two collections sharing a visualization. If, when generating a visualization, a first of the two collections is selected as a collection in which to display the visualization, the DPA may determine that the two collections are related and cause display of a recommendation to select the other of the two collections as a collection in which to display the visualization. In an embodiment, the DPA determines a level of relevance to the visualization of different collections and recommends the collections with the highest levels of relevance and/or recommends the collections in an order determined by level of relevance.

The level of relevance for a collection may be determined based on a number of selected collections for the visualization that are determined to be related to the collection and/or a number of visualizations shared between collections selected collections and the collection. For example, if three collections are selected, two of which are determined to be related to a first collection and one of which is determined to be related to a second collection, the DPA may determine that the first collection has a higher level of relevance than the second collection. As another example, if the three collections include a total of five visualizations that are included in a first collection and a total of three visualizations that are included in a second collection, the DPA may determine that the first collection has a higher level of relevance than the second collection. A combination of the above methods may be used, such as with a level of relevance determined as R=C+wV with R being the level of relevance for an evaluated collection, C being a number of collections or percentage of collections shared between selected collections and the evaluate collection, w being a pre-determined or dynamically determined weight, such as 0.3, and V being a number of visualizations or a percentage of visualizations shared between selected collections and the evaluated collection.

In some embodiments, the DPA displays a recommendation to add a visualization that is being generated to a particular collection in response to determining that a query from which the visualization is created is related to the particular collection. For example, the DPA may determine a number of semantic classes in the query that match semantic classes in the particular collection. If a number or percentage of semantic classes in the query that match semantic classes in the particular collection is greater than a threshold value or percentage respectively, the DPA may determine that the query is related to the particular collection. In some embodiments, the DPA may determine a level of relevance based on a number of matches of the semantic classes of the query to semantic classes of queries from which visualizations were generated for a collection. For example, if the semantic class of "teachers" in the particular query is shared with five queries of a first collection and three queries of a second collection, the DPA may determine that the first collection has a higher level of relevance to the particular query than the second collection.

In some embodiments, the DPA determines that a collection is relevant to a particular query based on a number of occurrences of uncommon semantic classes of the particular query in the collection. For example, the DPA may evaluate the semantic classes for the query and determine that one or more of the semantic classes of the query are common amongst queries that form the basis for visualizations in all the collections. The DPA may additionally determine that one or more semantic classes of the query are uncommon amongst queries that form the basis for visualizations in all the collections. The semantic classes of the query that are determined to be uncommon amongst queries that form the basis for visualizations in all the collections are herein referred to as "uncommon classes."

Determining that a semantic class is common amongst queries that form the basis for visualizations in all the collections may comprise determining that a frequency of occurrences of the semantic class in the queries that form the basis for visualizations in all the collections is greater than a threshold value, such as 70%. In some embodiments, multiple versions of a visualization and/or multiple visualizations from a single query are treated as one instance for the purpose of determining a frequency of occurrences of the semantic class in the queries. For example, if the collections include a total of six visualizations with five of the visualizations being a same visualization in a different collection and/or a visualization from a same query, the DPA may determine that a semantic class that matches only that query has a frequency of 50% despite the semantic class being a basis for five out of six visualizations. In other embodiments, each instance of the semantic class is counted across same visualizations in different collections and/or visualizations from a same query.

Determining that a semantic class is uncommon amongst queries that form the basis for visualizations in all collections may comprise determining that a frequency of occurrences of the semantic class in the queries that form the basis for visualizations in all collections is less than a threshold value, such as 30%. In some embodiments, the threshold value is a same value as is used to identify semantic classes that are common, thereby generating a binary system where a semantic class is either identified as common or uncommon. In such embodiments, identifying the common semantic classes may be performed by determining semantic classes do not comprise uncommon semantic classes or vice versa. In other embodiments, the threshold value is a different value, thereby creating a trinary system where a semantic class is common, uncommon, or neither common nor uncommon.

In an embodiment, the DPA determines that a collection is related to a query by determining that an uncommon semantic class of the query is common amongst queries in the collection. Determining that a semantic class is common amongst queries in the collection may comprise determining that a frequency of the semantic class in queries that form basis of visualizations in the collection is greater than a threshold value, such as 70%. In some embodiments, the DPA determines that a collection is related to a query if all uncommon semantic classes of the query are common amongst queries that form the basis of visualizations in the collection or if greater than a threshold percentage of semantic classes of the query are common amongst queries that form the basis of visualizations in the collection.

In an embodiment, the DPA determines a level of relatedness of a collection to a particular visualization based on shared semantic classes between queries that form the basis of visualizations in the collection and the query that forms the basis of the particular visualization. For example, the DPA may compute a relatedness value as a weighted sum of shared semantic classes less a weighted sum of unshared semantic classes with the weights being based on the commonality of the semantic class amongst the plurality of other queries. As an example, an equation for computing relatedness may comprise:

$$R = \frac{1}{n}\sum_{v=1}^{n}\frac{(w_1 c_{u,s} + w_2 c_{c,s}) - (w_3 c_{u,n} + w_4 c_{c,n})}{c}$$

where n is the number of visualizations (v) in the collection, $w_n$ is a weight, $c_{u,s}$ is a number of uncommon semantic classes of the query that forms the basis for the particular visualization that are shared with the query that forms the basis for the visualization of the collection, $c_{c,s}$ is a number of common semantic classes of the query that forms the basis for the particular visualization that are shared with the query that forms the basis for the visualization of the collection, $c_{u,n}$ is a number uncommon semantic classes of the query that forms the basis for the particular visualization that are not shared with the query that forms the basis for the visualization of the collection, and $c_{c,n}$ is a number of common semantic classes of the query that forms the basis for the particular visualization that are not shared with the query that forms the basis for the visualization of the collection. Example weights include $w_1=1$, $w_2=0.5$, $w_3=0.4$, and $w_4=0.75$. Other examples may use the frequency of the class amongst queries of all collections, such as by:

$$R = \frac{1}{n}\sum_{v=1}^{n}\left(\sum_{c_s=1}^{m} w_1 f_{c_s} - \sum_{c_u=1}^{p} w_2 f_{c_u}\right)$$

where n is the number of visualizations (v) in the collection, $w_n$ is a weight, m is a number of semantic classes of the query that forms the basis for the particular visualization that are shared with the query that forms the basis for the visualization of the collection ($c_s$), p is a number of semantic classes of the query that forms the basis for the particular visualization that are not shared with the query that forms the basis for the visualization of the collection ($c_u$), and $f_n$ is a frequency of the semantic class amongst other queries.

While the above is described with respect to semantic classes, some embodiments may employ a similar analysis based on attributes and/or attribute aggregates. For example, the DPA may determine that a visualization is related to another collection based on shared attributes between the query that forms the basis for the visualization and the attributes of the queries that form the basis of visualizations in the collection. Thus, any of the analyses described herein with respect to semantic classes may be performed with respect to attributes.

Similarly, the DPA may determine that a visualization is related to another collection based on shared aggregations of attributes between the query that forms the basis for the visualization and the queries that form the basis of visualizations in the collection. For example, if a query includes an aggregation of teacher salary by district, the DPA may determine a number of instances of the aggregation of teacher salary by district in queries that form the basis of visualizations in a collection and determine the relatedness of the query to the collection based on the determined number of instances using the methods described herein. Additionally or alternatively, the DPA may determine relatedness based on similar aggregations comprising aggregations of different attributes with a same type of aggregation. For example, two queries that both contain an aggregation of "teacher salary by district" would be considered to have a shared aggregation whereas a query with the aggregation of "teacher salary by district" would be considered to have a similar aggregation as a query with the aggregation of "student test scores by district" as both are aggregated by district but include different attributes that are being aggregated.

The following equation provides a practical example of determining a level of relatedness based on shared attributes:

$$R = \frac{1}{n}\sum_{v=1}^{n}\left(\sum_{a_s=1}^{m} w_1 f_{a_s} - \sum_{a_u=1}^{p} w_2 f_{a_u}\right)$$

where n is the number of visualizations (v) in the collection, $w_u$ is a weight, m is a number of attributes of the query that forms the basis for the particular visualization that are shared with the query that forms the basis for the visualization of the collection ($a_s$), p is a number of attributes of the query that forms the basis for the particular visualization that are not shared with the query that forms the basis for the visualization of the collection ($a_u$), and $f_n$ is a frequency of the attribute amongst other queries.

In some embodiments, a combination of the above methods may be employed to determine a level of relatedness. For example, the DPA may identify a combination of two or more of shared semantic classes, shared attributes, or shared aggregations of attributes between the query that forms the basis of the visualization and queries that form the basis of visualizations in a plurality of collections. The DPA may use the methods described herein for determining if the visualization is related to the collection and/or a level of relatedness using the combination. In some embodiments, the DPA applies different weights depending on what is shared between the queries. For example, a higher weight may be applied to aggregations of attributes that are shared than the weight applied to attributes that are shared which is higher than the weight applied to semantic classes that are shared. The following equation provides a practical example of determining a level of relatedness based on a combination of shared semantic classes, shared attributes, and shared aggregations:

$$R = \frac{1}{n}\sum_{v=1}^{n}\left(\sum_{c_s=1}^{m} w_1 f_{c_s} - \sum_{c_u=1}^{p} w_2 f_{c_u}\right) +$$

-continued $$\left(\sum_{a_s=1}^{q} w_1 f_{a_s} - \sum_{a_u=1}^{r} w_2 f_{a_u}\right) + \left(\sum_{agg_s=1}^{s} w_5 f_{agg_s} - \sum_{agg_u=1}^{t} w_6 f_{agg_u}\right)$$

where n is the number of visualizations (v) in the collection, $w_u$ is a weight, m is a number of semantic classes of the query that forms the basis for the particular visualization that are shared with the query that forms the basis for the visualization of the collection ($c_s$), p is a number of semantic classes of the query that forms the basis for the particular visualization that are not shared with the query that forms the basis for the visualization of the collection ($c_u$), q is a number of attributes of the query that forms the basis for the particular visualization that are shared with the query that forms the basis for the visualization of the collection ($a_s$), r is a number of attributes of the query that forms the basis for the particular visualization that are not shared with the query that forms the basis for the visualization of the collection ($a_u$), s is a number of attribute aggregations of the query that forms the basis for the particular visualization that are shared with the query that forms the basis for the visualization of the collection ($agg_s$), t is a number of attribute aggregations of the query that forms the basis for the particular visualization that are not shared with the query that forms the basis for the visualization of the collection ($agg_u$), and $f_n$ is a frequency of the semantic class, attribute, or aggregation amongst other queries. Similar combinations may be utilized with any of the described methods for determining relatedness of visualizations to collections.

In an embodiment, the DPA automatically only adds a visualization to a collection after displaying a recommendation to add the visualization to the collection. In other embodiments, the DPA automatically adds the visualization to the collection in response to determining that the query that forms the basis of the visualization is related to the collection. In some embodiments, the DPA determines a level of relatedness of a visualization formed from a particular query to a collection using the methods described herein. For example, the DPA may determine the level of relatedness based on a number of visualizations in the collection that share an uncommon semantic class with the particular query, a number of instances of shared uncommon semantic classes of the particular query with semantic classes of visualization in the collection, or using any of the methods previously described. Based on the level of relatedness, the DPA may determine whether to automatically add the visualization to a collection, recommend adding the visualization to a collection, or determine an order in which to recommend collections for the visualization. As a practical example, if the relatedness of the visualization to the collection is above a threshold value, such as 90%, the DPA may automatically add the visualization to the collection.

After parameters for the visualization have been selected in interface 500, the server computer may generate the visualization and cause display of the visualization through a graphical user interface. The graphical user interface may include options for viewing visualizations corresponding to different collections. When a collection is selected, the server computer may cause display of each visualization for which the collection was identified.

Figure 6:
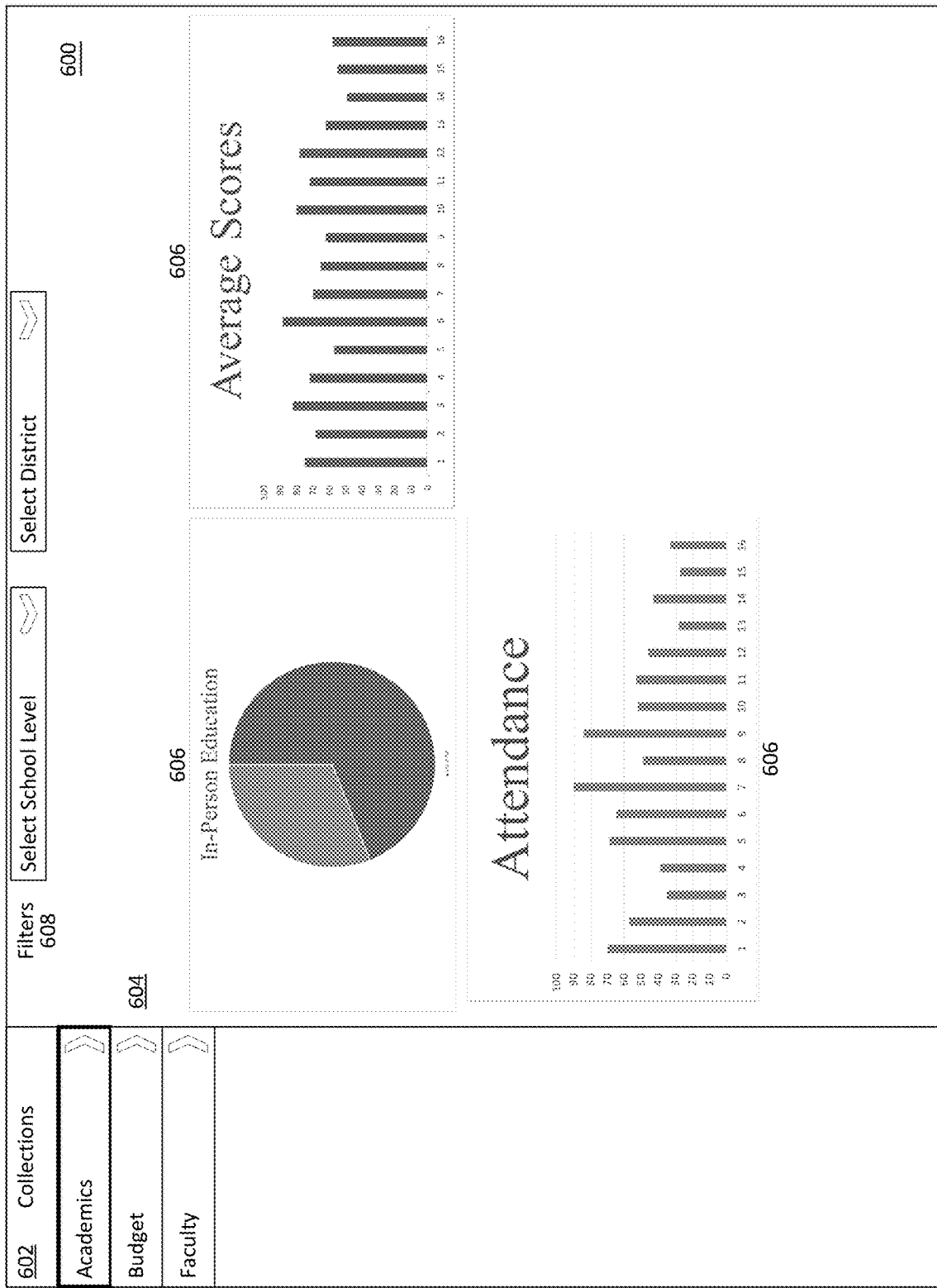
FIG. 6 depicts an example graphical user interface for displaying one or more collections of visualizations, in accordance with some embodiments of the disclosure.

FIG. 6 depicts an example graphical user interface for displaying one or more collections of visualizations. Interface 600 comprises collection selection 602 and collection interface 604. Collection selection 602 comprises a plurality of collections generated for groupings of visualizations. For example, the "Academics" collection may contain each visualization that was assigned to the "Academics" collection through user input using the methods described herein. Collection interface 604 comprises visualizations 606 and filters 608. Visualizations 606 comprise a plurality of visualizations generated from queries generated using the methods described herein. In the example of FIG. 6, visualizations 606 comprise a pie chart and two bar graphs. The visualizations may be of different types and/or generated from different queries, as long as the collection is selected for the visualization.

Filters 608 comprise a set of filters that may be applied to the visualizations in the collection interface 604. In an embodiment, the server computer populates the filters based on the visualizations included in the collection. For instance, the server computer may identify, for each visualization in a collection, a query from which the filter was generated. The server computer may identify filters selected for the query and populate the set of filters for the collection with the filters selected for the queries. For instance, in the "Student Scores" example described with respect to FIG. 4, the server computer may receive input selecting, as filters for the "Student Scores" query, a filter for different school levels, such as "School Level=Elementary School," "School Level=Middle School," and "School Level=High School." The server computer may additionally receive a request to generate a visualization for average scores by region with an identification of the "Academics" collection, such as shown in FIG. 5. In response to the "Student Scores" query including filters for different school levels and in response to the "Academics" collection including the "Average Scores" visualization generated from the "Student Scores" query, the server computer may populate filters 608 with a filter based on school levels. Thus, the filter types and filters within the filter types may be dynamically determined for each collection based on the visualizations included in the collection.

Figure 7:
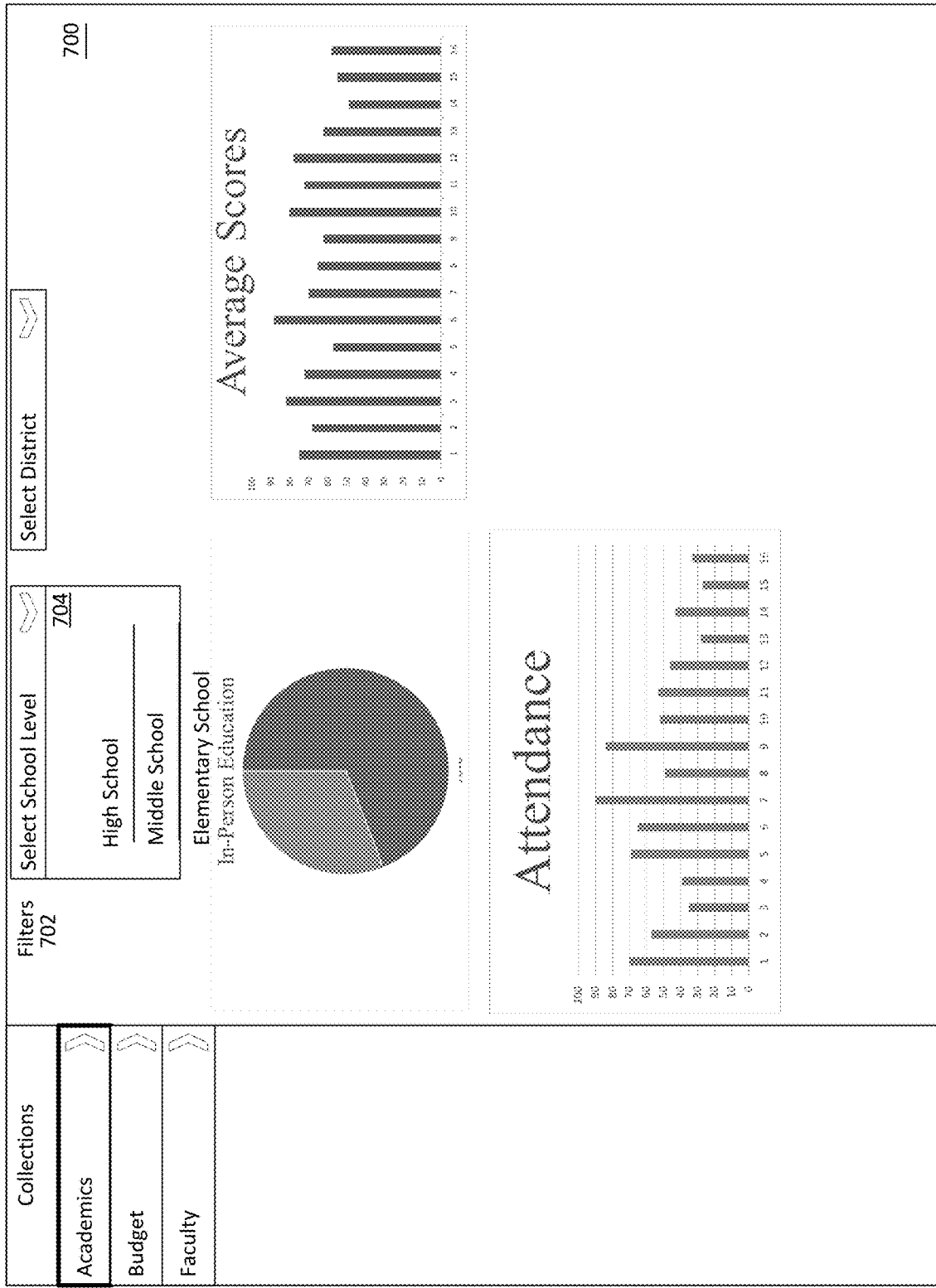
FIG. 7 depicts an example graphical user interface for filtering one or more collections of visualizations, in accordance with some embodiments of the disclosure.

FIG. 7 depicts an example graphical user interface for filtering one or more collections of visualizations. FIG. 7 may be displayed in response to a selection of the "Select School Level" filter of filters 608 in FIG. 6. As depicted in interface 700 of FIG. 7, when the "Selected School Level" filter of filters 702 is selected, a drop-down menu 704 is displayed with the filters populated based on the visualizations included in the collection. For example, because the "Average Scores" visualization is included in the "Academics" collection, interface 7 includes filters from the query used to generate the "Average Scores" visualization.

In an embodiment, the server computer populates the filters options of the interface only if the filters are selected for the visualizations. For example, the interface for generating visualizations may include options for selecting filters to include for the visualizations. Filters selected for visualizations may be used to populate the "filters" options of the interfaces for the collections that include the visualizations. Thus, if the "School Level" filter is selected when the visualization for "Average Scores" is selected, the DPA may populate the "Filters" option of FIG. 7 with the different school levels.

After a filter has been selected, the DPA applies the filter to the data used to generate the visualizations and updates the visualizations in the collection based on the filtered data. For example, the search query that is used to generate the "Average Scores" graph may return a plurality of columns of data including a test score column and a district identifier column. If the "School Level" filter is additionally selected, the plurality of columns of data may include a school level column. Thus, each row includes data identifying a test score (or average test score), a district, and a school level. When the initial "Average Scores" visualization is generated, the data used to generate the visualization is the average test scores for each district. When the "School Level" filter is applied, the DPA filters the data by the selected school level, such as only including data designated as "High School" in the school level column, and generates a new visualization using the filtered data.

In some embodiments, a filter is only displayed on the graphical user interface for a collection if the filter applies to each visualization of the collection. For example, if one of the queries selected for a collection does not include a filter for "School Level," then the collection may not include the filter for "School Level." Alternatively, a filter may be displayed on the graphical user interface for a collection as long as the filter applies to a threshold number or percentage of visualizations, such as one visualization or ten percent of the visualizations. In such embodiments, when a filter is selected, each visualization for which the filter applies may be updated with the filtered data.

In some embodiments, if a filter is selected through the graphical user interface for a collection that includes a visualization to which the filter does not apply, the DPA may continue to display the unfiltered version of the visualization, but may provide an indication that the visualization has not been filtered. The indication may include a change in border color, a notification, such as a banner, or any other visual indication that the visualization was not changed by the applied filter.

In some embodiments, if a filter is selected through the graphical user interface for a collection that includes a visualization to which the filter does not apply, the DPA may remove the visualization from the graphical user interface for the collection. For example, if the "Attendance" visualization was generated from a query that did not include a "School Level" filter, the DPA may remove the "Attendance" visualization from the graphical user interface in response to receiving a request, through the "Filter" option, to filter the visualizations by "School Level."

In some embodiments, if a visualization was removed from the graphical interface in response to a determination that a filter does not apply to the visualization, such as due to the query from which the visualization was generated not including the filter, the DPA causes display of a notification on the graphical user interface indicating that a visualization has been removed. For example, if the "Attendance" visualization was removed from the graphical user interface, the DPA may update the graphical user interface to display a notification indicating that the "Attendance" visualization was removed due to the query and/or visualization not including the filter.

In some embodiments, if a visualization was removed from the graphical user interface in response to a determination that a filter does not apply to the visualization, the DPA causes display of an option to add the filter to the query and/or visualization. For example, if the filter was selected for the query but not for the visualization, the DPA may display an option to add the filter to the visualization and, in response to a selection of the option, update stored data to indicate that the filter has been applied to the visualization and/or cause display of an updated version of the visualization with the filter.

If the filter was not selected for the query, the DPA may update the query to include the filter, such that the attribute of the filter is obtained when the query is run. The DPA may rerun the query and to obtain the attribute of the filter for the queried data and generate a new visualization filtered by the attribute. In this manner, a visualization dashboard is used to update and change the queries such that information that may have previously been missed is obtained in the future.

In some embodiments, a visualization is added to the graphical user interface in response to a determination that mandatory filter requirements of the visualization have been met by the selected filter. For example, the DPA may provide options for specifying mandatory filters for a query and/or visualization, such as through the interfaces of FIG. 4 or FIG. 5. When a collection is being displayed which includes the visualization with the mandatory filter, the DPA may determine whether the mandatory filter has been selected. If the mandatory filter has not been selected, the DPA may determine that the visualization is not to be displayed in the collection. In response to receiving a selection of the mandatory filter, the DPA may add display of the visualization to the collection.

In some embodiments, in response to determining that a visualization in a collection contains a mandatory filter, the DPA initially displays the collection with the mandatory filter selected, thereby causing the visualization with the mandatory filter to be initially displayed. If the mandatory filter is selected through the graphical user interface to be removed, the DPA may remove the visualization from display, as the mandatory filter of the visualization is no longer selected.

Figure 8:
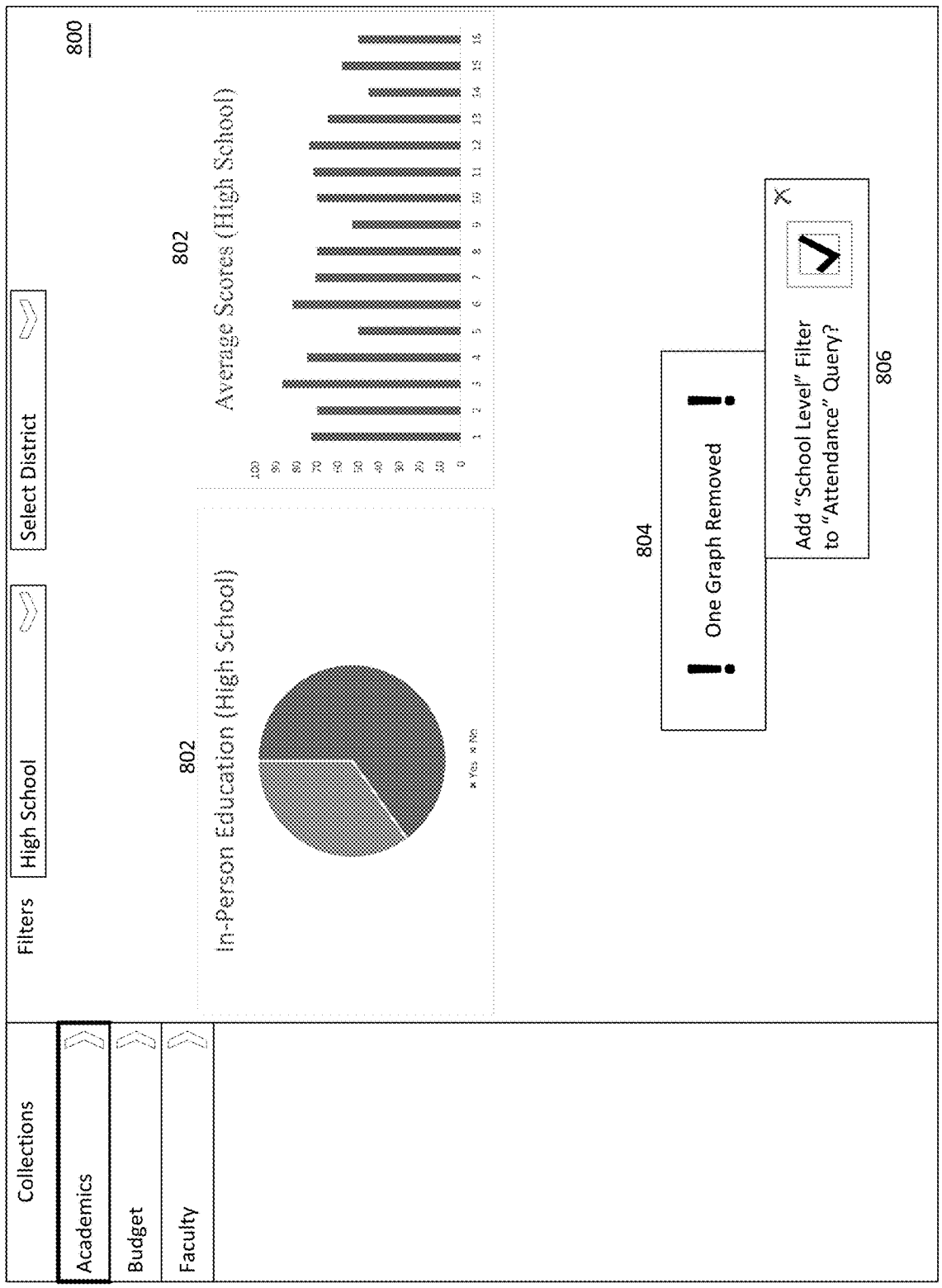
FIG. 8 depicts an example graphical user interface for filtering visualizations based on a selected filter, in accordance with some embodiments of the disclosure.

FIG. 8 depicts an example graphical user interface for filtering visualizations based on a selected filter. FIG. 8 may be displayed in response to a selection of the "High School" attribute in the "School Level" filter of FIG. 7. In interface 800 of FIG. 8, two of the three visualizations from FIG. 7 have been updated based on the filter of "High School" being applied to the datasets from which the visualizations were created. Thus, the two remaining visualizations comprise visualizations which have been generated from data sets that were filtered to only include data with the "High School" value for the "School Level" attribute. In some embodiments, the DPA modifies the graphical user interface to indicate that the visualizations have been filtered based on the selected filter. For example, the titles of visualizations 802 have been modified to include an indication that visualizations 802 were filtered by the "High School" value of the "School Level" attribute.

Interface 800 additionally includes notification 804 and filter addition option 806. Notification 804 comprises a notification indicating that one of the visualizations in the collection were removed in response to a selection of a filter that does not apply to the visualization. In some embodiments, the notification identifies the visualization and/or query from which the visualization was created which was removed from the interface. Filter addition option 806 comprises an option to update the query from which the visualization was created to include the filter which caused the visualization to be removed.

In some embodiments, filter addition option 806 is displayed in response to a determination that the attribute of the filter is included in one of the semantic classes of the query. For instance, each query built in interface 400 of FIG. 4 includes a one or more semantic classes defined for the query. Each of the semantic classes comprises one or more attributes. The DPA may determine, for the removed visualization, whether any of the semantic classes that form the query include the attribute selected to filter the visualizations. If the query includes a semantic class that includes the attribute selected to filter the visualizations, the DPA may cause display of the option to add the filter to the query.

In some embodiments, the DPA automatically adds filters to queries in response to a selection of a filter for a visualization generated from the query. For example, in response to the selection of the "High School" value for the "School Level" attribute, the DPA may identify one or more visualizations that were generated from a query that does not include the "School Level" attribute as a filter. The DPA may update the query to include the "School Level" attribute, run the updated query to obtain the "School Level" attribute, and cause display of a visualization filtered by the "School Level" attribute. In some embodiments, the DPA adds the filters to the queries only in response to determining that the attribute of the filter is included in a semantic class of the query.

In an embodiment, the DPA adds a filter to a query in response to receiving a request to add a visualization generated from the query to a collection that includes the filter. For example, when a visualization is generated from a query in FIG. 5, the DPA receives input identifying one or more collections to which the visualization is to be added. The DPA may identify one or more other visualizations that are included in a collection to which the visualization is to be added. The DPA may determine if the one or more other visualizations include filters that are not included in the query from which the visualization was created and add the filters to the query. In an embodiment, the DPA also determines if a semantic class of the query from which the visualization was created includes a semantic class which includes the attribute of the filter and only adds the filter to the query if the query includes a semantic class which includes the attribute of the filter.

In some embodiments, the DPA causes display of an option to add the filter to the query when the request to generate the visualization is received. For example, the DPA may identify filters for the other visualizations in a collection to which the visualization being generated is to be added and may cause display of an option to add one or more of the filters to the visualization and/or the query. In this manner, the DPA identifies related queries through visualizations of the queries being included in a same collection interface and uses the relation information to generate options for strengthening the queries.

The DPA may additionally or alternatively display an option to add a filter to other queries when a request is received to add a visualization to a particular collection. For example, the DPA may identify one or more filters in a query used to generate the visualization and determine whether queries used to generate other visualizations in the particular collection include the one or more filters. If one of the queries used to generate another visualization in the particular collection does not include the one or more filters, the DPA may cause display of an option to add the filter the query.

A practical example of the above is provided with respect to an "Attendance" visualization. When the "Attendance" visualization is generated using the interface of FIG. 5, the "Academics" collection is selected as a collection in which to include the visualization. The query used to generate the "Attendance" visualization includes a "District" filter. The DPA determines the "Academics" collection includes two other visualizations: the "In-Person Education" visualization and the "Average Scores" visualization. Both the "In-Person Education" visualization and the "Average Scores" visualization include a "School Level" filter, but only the "In-Person Education" visualization includes a "District" filter. The DPA determines that the query used to generate the "Attendance" visualization does not include the "School Level" filter and, in response to determining that the "School Level" filter is included for the other visualizations in the "Academics" collection and not included in the query used to generate the "Attendance" visualization, the DPA causes display of an option to add the "School Level" filter to the query used to generate the "Attendance" visualization. Additionally, in response to determining that the "Attendance" visualization includes the "District" filter but the query used to generate the "Average Scores" visualization does not include the "District" filter, the DPA causes display of an option to add the "District" filter to the query used to generate the "Average Scores" visualization after receiving the request to generate the "Attendance" visualization.

In an embodiment, the DPA identifies related collections based on visualizations included in the collections. For instance, if a visualization is included in two different collections, the DPA may determine that the two collections are related. The DPA may additionally or alternatively determine that collections are related based on the queries used to generate visualizations. For example, if a query is used to generate two different visualizations that are included in two different collections, the DPA may determine that the two different collections are related. In an embodiment, the DPA determines a level of relationship between collections. For instance, the DPA may determine a number of visualizations shared between pairs of collections as a level of relationship. The DPA may additionally determine that two collections have a higher level of relationship if they share a visualization than if they share a query as a source of visualizations. Thus, if a first collection shares three visualizations with a second collection, one visualization with a third collection, and one query as a basis for a visualization with a fourth collection, the DPA may determine that the first and second collections share a higher level of relationship than the first and third collections, which share a higher level of relationship than the first and fourth collections.

In an embodiment, the DPA identifies related collections based on a determined level of relatedness of each visualization in a first collection to a second collection. For example, for each visualization of a first collection, the DPA may compute a level of relatedness of the visualization to the second collection using the methods previously described herein. The DPA may determine an average level of relatedness of visualizations in the first collection to the second collection and determine that the first collection is related to the second collection if the average level of relatedness is greater than a threshold value.

The DPA may cause display of options to switch from a displayed collection to a collection determined to be related using the methods described herein. For example, the DPA may cause display, on a graph user interface, of an option to switch between collections. The option may include a search interface for searching through collections and/or an option for identifying collections related to a particular collection. In an embodiment, the interface displays related collections in an order determined based on levels of relationship. Thus, in the above example, when viewing collections related to the first collection, the interface may display the second collection, followed by the third collection, followed by the fourth collection.

Figure 9:
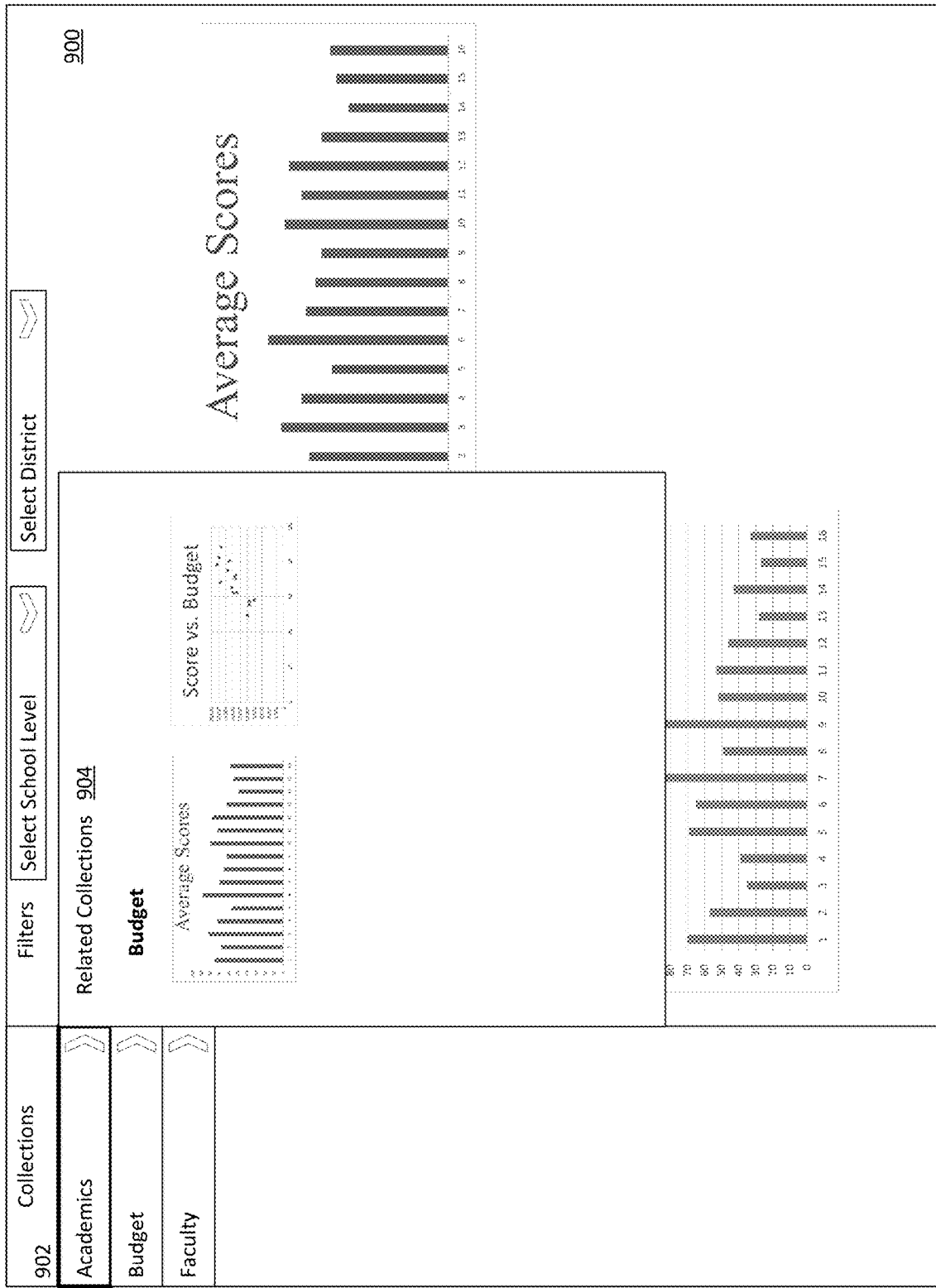
FIG. 9 depicts an example of a graphical user interface for displaying related collections, in accordance with some embodiments of the disclosure.

FIG. 9 depicts an example of a graphical user interface for displaying related collections. Interface 900 includes collection identifiers 902. When a collection identifier is selected of collection identifiers 902, the graphical user interface displays related collections 904. In the example of FIG. 9, only one collection was identified as being related to the "Academics" collection, so the identified collection, the "Budget" collection, is displayed in the related collections 904. As depicted, the "Budget" collection may be identified as related to the "Academics" collection as both collections include the "Average Scores" visualization. In response to a selection of a related collection, the DPA may cause interface 900 to navigate to an interface corresponding to the selected collection.

In some embodiments, the graphical user interface may be configured to display related collections based on selected visualizations. For example, an option may be displayed on the graphical user interface oriented near a visualization. When the option is selected, the graphical user interface may display identifiers of collections that include the visualization. For example, if an option for identifying collections with the "Average Scores" visualization is selected, the graphical user interface may cause display of an identifier of the "Budget" collection with an option to navigate to the budget collection. In this manner, the graphical user interface provides unique navigation options whereby collections that share visualizations can be immediately identified and navigated to with minimal input.

In some embodiments, the DPA determines that a visualization is related to one or more collections based on the semantic classes of the visualization, such as by using the methods described previously. The DPA may, in response to receiving a selection of a visualization, cause display of identifiers of collections identified to be related to the selected visualization, such as based on a number of overlapping uncommon semantic classes of the query of the selected visualization with queries that form the basis for visualizations of the collections. In embodiments where a level of relatedness is computed, the collections may be ordered by the level of relatedness, with collections that include the selected query being displayed first.

In some embodiments, in response to a selection of a visualization, the DPA causes display of visualizations determined to be related to the selected visualization. The DPA may determine that a visualization is related to a selected visualization by determining that the visualization is in a same collection as the selected visualization, by determining that the visualization shares one or more uncommon semantic classes with the selected query, by determining that the visualization shares more than a first threshold number or percentage of common semantic classes with the selected visualization and a second threshold number or percentage of uncommon semantic classes with the selected visualization, and/or that a level of relatedness, computed using the methods described previously herein, between the queries is greater than a threshold value.

In some embodiments, the related visualizations are displayed in an overlay window. In response to a selection of a related visualization, the DPA may cause display of identifiers of collections that include the related visualization. When a collection is selected, the DPA may navigate to the selected collection. Additionally or alternatively, in response to the selection of a related visualization through user input, such as a click, tap, or hovering of a cursor over the visualization, the DPA may cause display of an option to add the related visualization to the currently viewed collection. Additionally or alternatively, in response to the selection of the related visualization, the DPA may identify one or more visualizations related to the selected related visualization and cause display of the one or more visualizations in a same manner, thereby allowing for navigation through visualizations based on their determined relationships.

In other embodiments, the DPA causes display of a new interface for the selected visualization. The new interface may have an appearance of a collection, but include visualizations determined to be related to the selected visualization. The new interface may include an option for generating a new collection, such that the displayed visualizations may be accessed as their own stored collection in the future without navigation through the selected query. The new interface may additionally include options for removing visualizations from the newly created collection and/or adding new visualizations to the newly created collection. In this manner, the DPA provides a unique method for generating a new collection based on a selected visualization.

Figure 10:
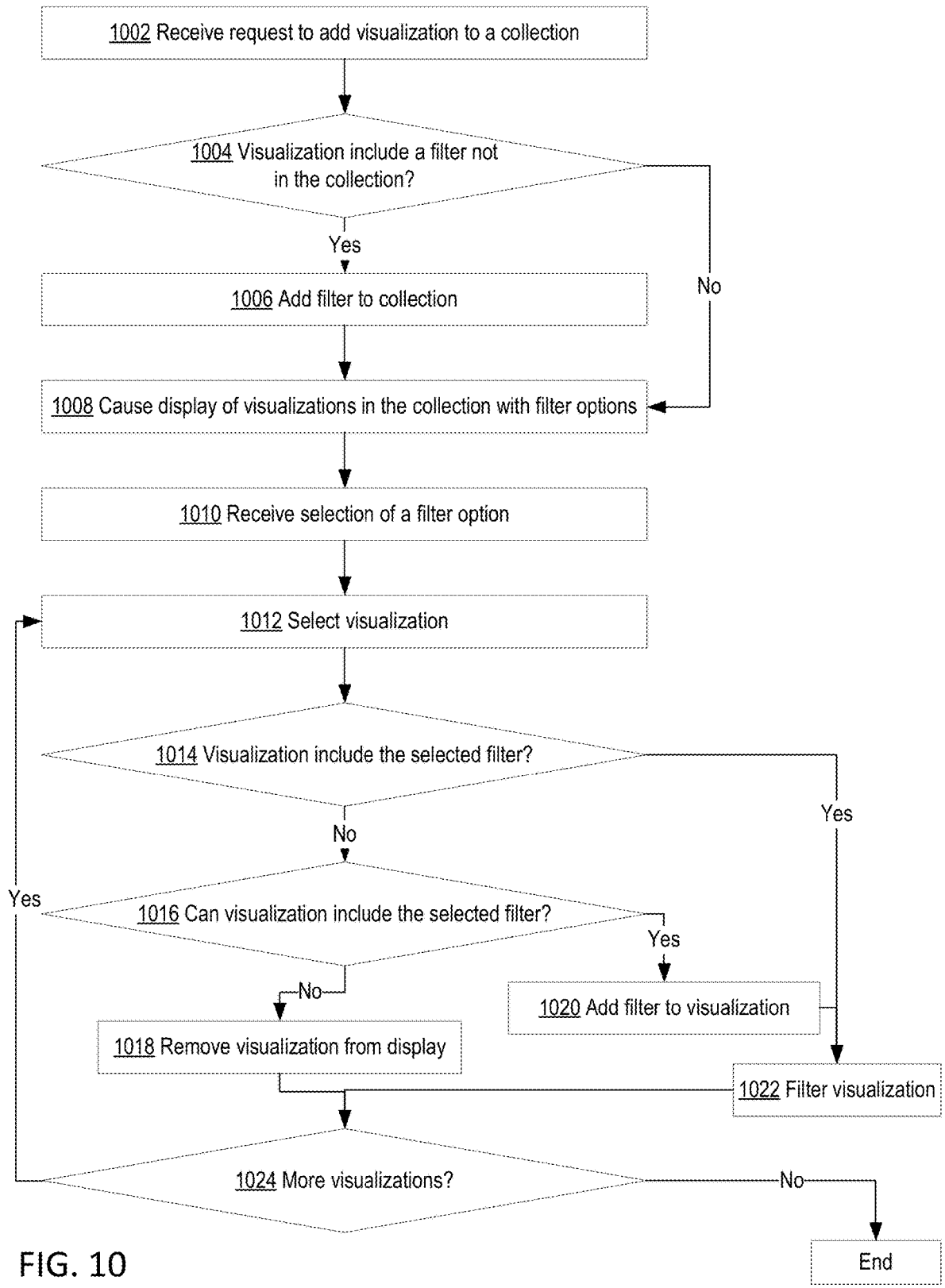
FIG. 10 depicts an example method for generating and utilizing filters for visualizations in a collection, in accordance with some embodiments of the disclosure.
Figure 11:
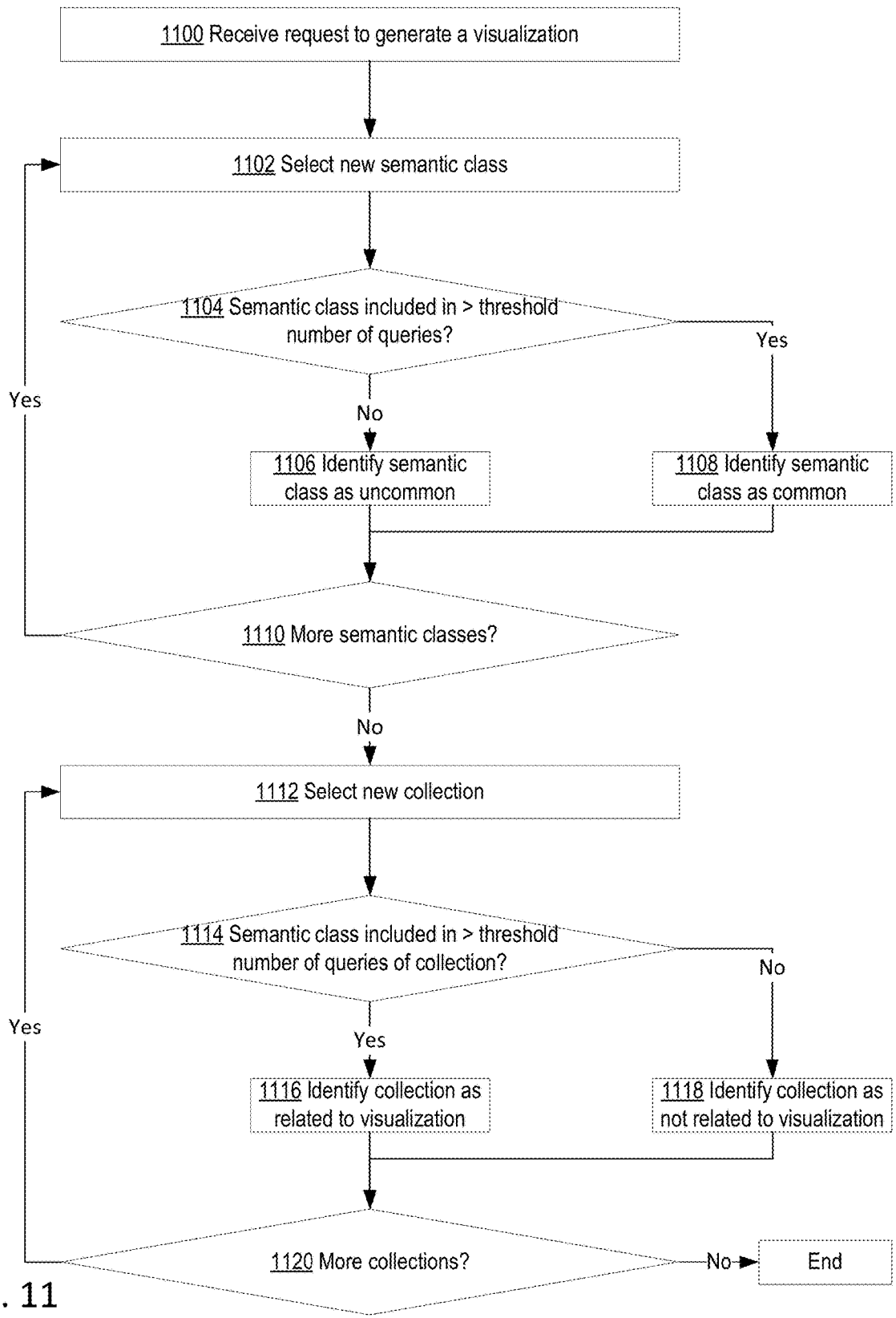
FIG. 11 depicts an example method for identifying collections related to a visualization, in accordance with some embodiments of the disclosure.

FIG. 10 depicts an example method for generating and utilizing filters for visualizations in a collection. The processes of FIGS. 10 and 11 are intended to provide a practical example of the methods described herein. Other embodiments may include more or less steps and/or steps in different orders. For instance, a process for filtering a collection may perform step 1018 instead of performing step 1016, thereby bypassing the addition of filters to queries that do not include the filters and instead removing them from display. Additionally, some of the described steps may be more complex in some embodiments, such as step 1114 of FIG. 11 which may be replaced with more complex computations to determine whether collections are related to a visualization as previously described herein.

At step 1002, an input/output (I/O) path (e.g., I/O path 1202) of a device, such as servers 1256-1258, receives a request to add a visualization to a collection. For example, the I/O path may receive a request through a graphical user interface to generate a new visualization for a query wherein the request identifies a collection to which the visualization is to be added. As another example, the I/O path may receive a request through a graphical user interface to add an existing visualization to a collection, such as through a collection interface or through a visualization generation interface.

At step 1004, control circuitry of the device (e.g., control circuitry 1204) determines whether the visualization includes a filter that is not already in the collection. For example, the control circuitry may identify each filter of the visualization or of the query used to generate the visualization and determine whether the filter has already been added to the collection to which the visualization is being added. This process may be performed when the request to add the visualization to the collection is received and/or when a request is received to display the collection. If the visualization does not include a filter not in the collection, then the process proceeds to step 1008 which is described further herein.

If at step 1004, control circuitry of the device determines that the visualization include a filter that is not already in the collection, at step 1006 control circuitry of the device adds the filter to the collection. Adding the filter to the collection may include storing data identifying the filter as a filter to be displayed for the collection. In some embodiments, in addition to adding the filter to the collection, control circuitry of the device identifies one or more other visualizations of the collection that could include the filter and generates and displays a recommendation to add the filter to the one or more other visualizations.

At step 1008, the I/O path of the device causes display of visualizations in the collection with the filter option. For example, the I/O path may receive a request to display the collection through a graphical user interface provided by the I/O path. In response, the I/O path may cause display of a graphical user interface including visualizations which were added to the collection and one or more options to filter the visualizations. This may also be caused on a remote device via a network interface 1210.

At step 1010, the I/O path of the device receives a selection of a filter option. The selection may include a selection of one or more values of an attribute by which to filter the visualizations. The filter options may each correspond to at least one of the visualizations displayed in the collection.

At step 1012, control circuitry of the device selects a new visualization. For example, the process of steps 1012-1022 may be performed for each visualization of the collection. In response to receiving the selection of the filter, control circuitry of the device selects a first visualization to analyze.

At step 1014, control circuitry of the device determines if the visualization includes the selected filter. For example, the control circuitry may determine if the query from which the visualization was generated was configured to include the selected attribute as a filter. If the visualization includes the selected filter, at step 1022, the control circuitry of the device filters the visualization as described further herein.

If, at step 1014, control circuitry of the device determines that the visualization does not include the selected filter, at step 1016, control circuitry of the device determines whether the visualization is capable of including the filter. For example, control circuitry of the device may determine that the visualization is capable of including the filter if any of the semantic classes of the query that forms the basis for the visualization includes the attribute of the filter. If the visualization is not capable of including the filter, at step 1018, control circuitry of the device removes the filter from the display. Removing the filter from the display may be performed when a new display is created for the filtered visualizations. Thus, removing the filter from the display may include not adding a filtered version of the visualization to a new display. In some embodiments, control circuitry of the device additionally causes display of a notification indicating that the visualization was removed from the display.

If, at step 1016, control circuitry of the device determines that the visualization is capable of including the filter, at step 1020, control circuitry of the device adds the filter to the visualization. For example, control circuitry of the device may update the query of the visualization to include the filter. In some embodiments, control circuitry of the device re-runs the query to obtain values for the attribute of the filter. In some embodiments, adding the filter to the visualization is performed in response to receiving input from a client device through the I/O path requesting the filter be added to the interface. For example, in response to determining the visualization can include the filter, the I/O path of the device may cause display, through a graphical user interface, of an option to add the filter to the visualization and may only perform step 1020 in response to receiving an affirmative response.

At step 1022, control circuitry of the device filters the visualization. For example, control circuitry of the device may filter the data used to generate the visualization by the value of the attribute that was selected as the filter and generate a new visualization with same parameters as the previous visualization, but using only the filtered data. The I/O path may then cause display of the filtered visualization on the graphical user interface.

At step 1024, control circuitry of the device determines if there are more visualizations. For example, control circuitry of the device may determine if other visualizations have not been analyzed with respect to the selected filter. If, at step 1024, control circuitry of the device determines there are more visualizations, the process proceeds to step 1012 and the control circuitry of the device selects a new visualization. If, at step 1024, control circuitry of the device determines there are no more visualizations, then the process ends and the filtered visualizations are displayed on the graphical user interface.

FIG. 11 depicts an example method for identifying collections related to a visualization. A system may cause display of a recommendation to add the visualization to the identified collections when the visualization is created, automatically add the visualization to the collection when the visualization is created, and/or use the relationships to intelligently display collections for navigation in a collection interface when a visualization is selected.

At step 1100, I/O path of a device (e.g., I/O path 1202), such as servers 1256-1258, receives a request to generate a visualization. For example, the I/O path may cause display of a graphical user interface on a user device with options for generating and/or modifying a query. The query interface may additionally include an option to generate a visualization from the query data with additional options for specifying visualization type and data elements. The selection of the option to generate the visualization may cause the client device to send the request to the I/O path of the device to generate the visualization.

At step 1102, control circuitry of the device (e.g., control circuitry 1204) selects a new semantic class to evaluate. For example, the control circuitry may identify a plurality of semantic classes of the query from which the visualization is being generated and select a first semantic class of the query to evaluate. Step 1104 may be performed in response to the request to generate the visualization, such that recommended collections may be displayed in a visualization building interface, and/or at a later point in time, such as in response to a selection of the visualization displayed on a visualization interface.

At step 1104, control circuitry of the device determines whether the selected semantic is included in a number of queries greater than a threshold number. For example, control circuitry of the device may identify each query that is used to generate a visualization of a collection and determine whether the selected semantic class is included in the query. The threshold number may be a set number of queries and/or a number determined by a number of queries that the selected semantic class is evaluated against. Thus, the determination may comprise a determination that a frequency of the semantic class amongst the plurality of queries is greater than a threshold value.

At step 1106, if the semantic class is determined to not be included in greater than a threshold number of queries, control circuitry of the device identifies the semantic class as uncommon. At step 1108, if the semantic class is determined to be included in greater than a threshold number of queries, control circuitry of the device identifies the semantic class as common. Identifying the semantic class as common or uncommon may comprise storing data indicating that the semantic class is common or uncommon. Additionally or alternatively, identifying the semantic class as common or uncommon may comprise a precursor to evaluating the semantic class against one or more collections. For example, control circuitry of the device may be configured to evaluate only uncommon semantic classes against the one or more collections. Thus, determining that the semantic class is uncommon may comprise determining that the semantic class is to be evaluated against the one or more collections whereas determining that the semantic class is common may comprise determining that the semantic class is not to be evaluated against the one or more collections.

At step 1110, control circuitry of the device determines whether there are more semantic classes to evaluate. For example, control circuitry of the device may evaluate each of the semantic classes of the query to determine whether the semantic classes are common or uncommon. If there are more semantic classes of the query that have yet to be evaluated, the process returns to step 1102 and the control circuitry selects a new semantic class to evaluate. If the control circuitry of the device determines there are no more semantic classes to evaluate, the process proceeds to step 1112 and the semantic classes of the query are evaluated against one or more collections.

At step 1112, control circuitry of the device selects a new collection to evaluate with respect to the query. For example, control circuitry of the device may identify one or more collections against which the query is to be evaluated and select a first collection from the one or more collections.

At step 1114, control circuitry of the device determines whether a semantic class of the query is included in a number of queries of the selected collection greater than a threshold number. For example, control circuitry of the device may identify each query that is used to generate a visualization of the selected collection and determine whether the semantic class is included in the query. The threshold number may be a set number of queries and/or a number determined by a number of queries that form the basis of visualizations in the selected collection. Thus, the determination may comprise a determination that a frequency of the semantic class amongst the plurality of queries is greater than a threshold value. The semantic class evaluated against the queries may comprise one or more of the semantic classes previously identified as uncommon.

At step 1116, if the semantic class is determined to be included in greater than a threshold number of queries of the collection, control circuitry of the device identifies the collection as related to the visualization. At step 1108, if the semantic class is determined to not be included in greater than a threshold number of queries of the collection, control circuitry of the device identifies the collection as not related to the visualization.

At step 1120, control circuitry of the device determines whether there are more collections to evaluate. For example, control circuitry of the device may evaluate each of the collections to determine if the collection is related to the visualization. If there are more collections that have yet to be evaluated, the process returns to step 1112 and the control circuitry selects a new collection to evaluate. If the control circuitry of the device determines there are no more collections to evaluate, the process ends and the control circuitry of the device stores data identifying the collections that are related to the visualization.

Figure 12A:
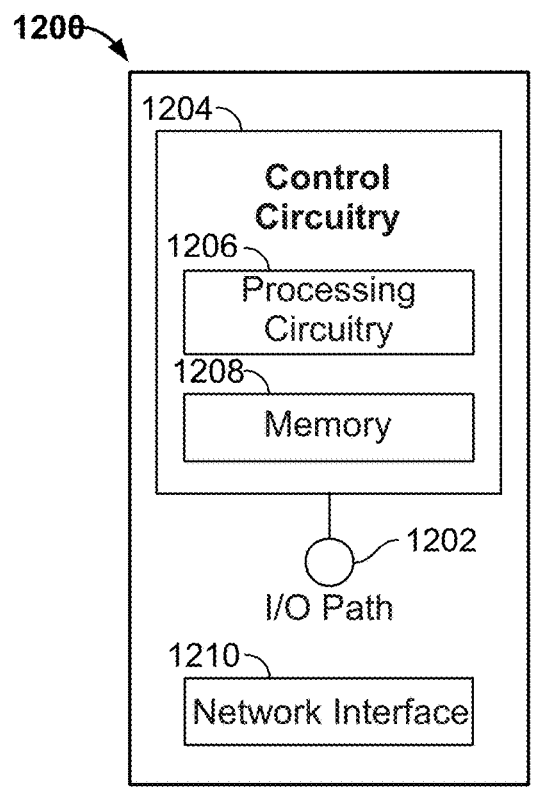
FIG. 12A shows a generalized embodiment of a device usable to provide data processing and visualization, in accordance with some embodiments of the disclosure.

FIG. 12A shows a generalized embodiment of a device usable to provide data processing and visualization as described above and below. In particular, device 1200 of FIG. 12 may be any of the devices that perform steps described in FIGS. 1-11. Device 1200 may receive data via data network interfaces 1210 and provide the received data to control circuitry 1204 via an input/output (I/O) path 1202. Control circuitry 1204 includes processing circuitry 1206 and storage 1208. Storage 1208 may include volatile memory 1230 (such as random-access memory (RAM), for example, static RAM and/or dynamic RAM), which does not retain its contents when power is turned off, and non-volatile memory 1208 (such as, for example, a solid state drive (SSD), a hard disk drive (HDD), electrically erasable programmable read-only memory (EEPROM), etc.), which does retain its contents when power is turned off. Control circuitry 1204 may send and receive commands, requests, and other suitable data using I/O path 1202. As noted above, I/O path 1202 connects control circuitry 1204 (and specifically processing circuitry 1206) to network interface 1210, which in turn connects device 1200 to one or more other devices. For example, I/O path 1202 may be used by one or more servers to received local or remote user interface input and provide visualization output to remote devices.

Control circuitry 1204 may be based on any suitable processing circuitry, such as processing circuitry 1206. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, octa-core, or any suitable number of cores). In some embodiments, processing circuitry is distributed across multiple separate processors or processing units, for example, multiple of the same type of processing units (e.g., two INTEL CORE i7 processors) or multiple different processors (e.g., an INTEL CORE i5 processor and an INTEL CORE i7 processor). In some embodiments, control circuitry 1204 executes instructions suitable to implement any of the techniques described above or below.

Storage 1208 may be an electronic storage device that is part of control circuitry 1204. As referred to herein, the phrase "electronic storage device" or "storage device" should be understood to mean any device for storing electronic data, computer software, instructions, and/or firmware, such as RAM, content-addressable memory (CAM), hard disk drives (HDDs), optical drives, solid state devices (SSDs), quantum storage devices, or any other suitable fixed or removable storage devices, and/or any combination of the same. The circuitry described herein may execute instructions included in software running on one or more general purpose or specialized processors. In some embodiments, storage 1208 may include a set of instruction, that when executed by control circuitry 1204 result in execution and operation of the DPA as described by FIGS. 1-11. In some embodiments, device 1200 may comprise user interface circuitry for receiving user input (e.g., via keyboard, mouse, touch screen or any other suitable user input device). user interface circuitry may provide input data to control circuitry 1204.

Figure 12B:
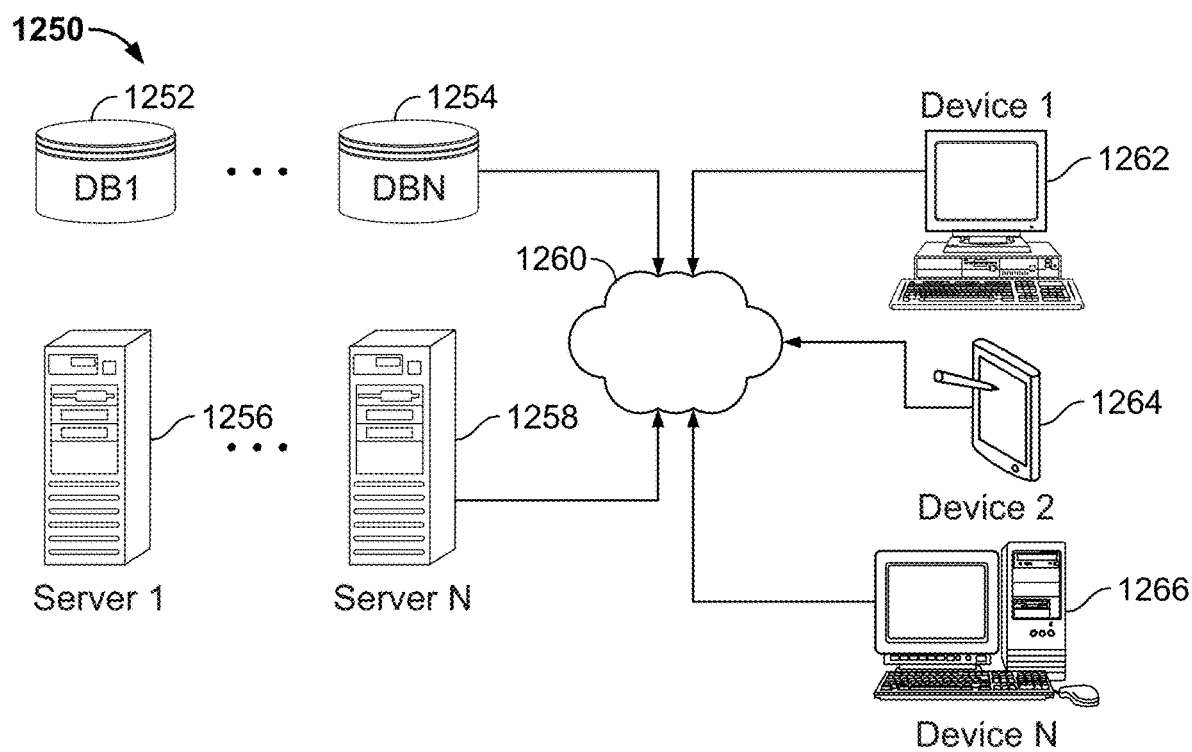
FIG. 12B shows a diagram of an illustrative system for performing data analysis and query user interface presentation, in accordance with some embodiments of the disclosure.

FIG. 12B shows a diagram of an illustrative system 1250 for performing data analysis and user interface presentation, in accordance with embodiments described in FIGS. 1-11. For example, system 1250 includes any number of servers 1256-1258 that may be configured to perform all aspects of the DPA as described as above and below. For example, the DPA may be executed by any of the servers 1256-1258 or by a combination of servers using suitable distributed computing techniques. Servers 1256-1258 may be communicatively connected to any number of databases 1252-1254 by local connection or via network 1260. Network 1260 may be any kind of a suitable network, such as Internet, intranet, private network, virtual network, cellular network, or any combination the above.

System 1250 may include any number of client devices 1262-1266 (e.g., PCs, computers, smartphones, laptops, PDA or any other suitable computer devices). Client devices 1262-1266 may be configured to interface with servers 1256-1258 via network 1260. Client devices 1262-1266 may be configured to provide UI input to servers 1256-1258, e.g., to define the semantic overlay data structure for tadeonal data sources (e.g., stored on Databases 1252-1254). Client devices 1262-1266 may be configured to provide query input to the DPA executing on servers 1256-1258. Client devices 1262-1266 may be configured to received output provided the DPA executing on servers 1256-1258. For example, client devices 1262-1266 may display visualizations and query results provided the DPA generated for display by servers 1256-1258 via network 1260. Each of devices 1262-1266, 1256-1258, and 1252-1254 may comprise hardware as shown by FIG. 12A and/or any other suitable hardware.

While the processes of FIGS. 10 and 11 described herein illustrate a single iteration of the operations to analyze data and display problem indicators on a user interface, those skilled in the art will appreciate that these processes may be iteratively repeated. The processes of FIGS. 10 and 11 described herein are intended to be illustrative and not limiting. More generally, the above disclosure is meant to be illustrative and not limiting. Only the claims that follow are meant to set bounds as to what the present invention includes. Furthermore, it should be noted that the features and limitations described in any one embodiment may be applied to any suitable other embodiment herein, and flowcharts or examples relating to one embodiment may be combined with any other suitable embodiment in a suitable manner, done in different orders, or done in parallel. In addition, the systems and methods described herein may be performed in real time. It should also be noted that the systems and/or methods described above may be applied to, or used in accordance with, other systems and/or methods.

It will be apparent to those of ordinary skill in the art that systems and methods involved in the present disclosure may be embodied in a computer program product that includes a non-transitory computer-usable and/or -readable medium. For example, such a non-transitory computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

What is claimed is:

1. A method comprising:
storing, in a non-transitory memory, a plurality of collections of visualizations of queries, each of the plurality of collections of visualizations of queries comprising a plurality of visualizations of queries, each of the plurality of visualizations of queries being formed from a query comprising a plurality of semantic classes, attributes, or attribute aggregations;
determining that a first semantic class, attribute, or attribute aggregation is common among queries of the plurality of visualizations of queries in each of the plurality of collections;
determining that a second semantic class, attribute, or attribute aggregation is common among queries of a plurality of visualizations of queries in a particular collection, but not common among the queries of the plurality of visualizations of queries in each of the plurality of collections;
receiving a user interface input to generate a new visualization of a query, the query comprising:
the first semantic class, attribute, or attribute aggregation that is common among queries of the plurality of visualizations of queries in each of the plurality of collections; and
the second semantic class, attribute, or attribute aggregation that is common among queries of the plurality of visualizations of queries in the particular collection, but not common among the queries of the plurality of visualizations of queries in each of the plurality of collections;
based on the received user interface input, causing display of the new visualization of the query on a graphical user interface;
determining that the query comprises the second semantic class, attribute, or attribute aggregation that is common among the queries of the particular collection, but not common among the queries of the plurality of visualizations of queries in each of the plurality of collections;
in response to determining that the query comprises the second semantic class, attribute, or attribute aggregation that is common among the queries of the particular collection, but not common among the queries of the plurality of visualizations of queries in each of the plurality of collections:
determining that a level of relatedness between the query and the particular collection exceeds a threshold value;
automatically, without receiving further user interface input, modifying the plurality of collections of visualizations of queries stored in the non-transitory memory by:
updating the particular collection by adding the new visualization of the query to the plurality of visualizations of queries in the particular collection, wherein the automatic updating of the particular collection is performed further in response to determining that the level of relatedness between the query and the particular collection exceeds the threshold value;
receiving a request to display the plurality of visualizations of queries of the updated particular collection; and
in response to receiving the request, causing display on the graphical user interface of the updated particular collection including the new visualization of the query.

2. The method of claim 1, wherein determining that the second semantic class, attribute, or attribute aggregation is not common among the queries of the plurality of visualizations of queries of each of the plurality of collections comprises determining that a frequency of occurrence of the second semantic class, attribute, or attribute aggregation in the queries of the plurality of visualizations of queries of each of the plurality of collections is lower than a threshold frequency value.

3. The method of claim 1, wherein determining that the second semantic class, attribute, or attribute aggregation is common among the queries of the plurality of visualizations of queries of the particular collection comprises determining that a frequency of occurrence of the second semantic class, attribute, or attribute aggregation in the queries of the plurality of visualizations of queries of the particular collection is greater than a threshold frequency value.

4. The method of claim 1, wherein the particular collection is a first collection, the graphical user interface is a first graphical user interface, the method further comprising:
determining that the new visualization of the query is related to a second collection of visualizations based, at least in part, on one or more visualizations of the second collection being formed from a query that includes the second semantic class, attribute, or attribute aggregation;

while the updated particular collection including the new visualization of the query is displayed on the first graphical user interface, receiving a user interface input selecting the new visualization of the query;

in response to receiving the user interface input selecting the new visualization of the query, causing display of an identifier of the second collection;

receiving a user interface input selecting the identifier of the second collection; and in response to receiving the user interface input selecting the identifier of the second collection, causing display of a second graphical user interface comprising the one or more visualizations of the second collection.

5. The method of claim 1, wherein the graphical user interface is a first graphical user interface, the method further comprising:

determining that the new visualization of the query is related to a particular plurality of queries based, at least in part, on each of the particular plurality of queries including the second semantic class, attribute, or attribute aggregation;

while the updated particular collection including the new visualization of the query is displayed on the first graphical user interface, receiving a user interface input selecting the new visualization of the query; and in response to receiving the user interface input selecting the new visualization, causing display of a second graphical user interface comprising a plurality of visualizations formed from the particular plurality of queries.

6. The method of claim 5, further comprising:

causing display of, on the second graphical user interface, an option to generate a new collection from the plurality of visualizations formed from the particular plurality of queries; and receiving a user interface input selecting the option to generate the new collection and, in response, storing, in the non-transitory memory, data identifying the plurality of visualizations formed from the particular plurality of queries as part of the new collection.

7. The method of claim 6, wherein the option to generate the new collection includes one or more options to add visualizations from other collections to the new collection and one or more options to remove visualizations from the new collection.

8. The method of claim 1, further comprising:

determining that the new visualization of the query is related to a visualization of a particular query based, at least in part, on the particular query including the second semantic class, attribute, or attribute aggregation;

while the updated particular collection including the new visualization of the query is displayed on the graphical user interface, receiving a user interface input selecting the new visualization of the query;

in response to receiving the user interface input selecting the new visualization, causing display of the visualization of the particular query; and receiving a user interface input selecting the visualization of the particular query and, in response, further updating the updated particular collection to include the visualization of the particular query and causing display on the graphical user interface of the further updated particular collection including the visualization of the particular query and the new visualization of the query.

9. The method of claim 1, wherein:

the particular collection is a first collection;

determining that the level of relatedness between the query and the particular collection exceeds the threshold value comprises computing a level of relatedness of the new visualization of the query to the particular collection; and the method further comprises:

computing a level of relatedness of the new visualization of the query to a second collection; and prioritizing the adding of the new visualization of the query to the particular collection over adding the new visualization of the query to the second collection in response to determining that the level of relatedness of the new visualization of the query to the particular collection is greater than the level of relatedness of the new visualization of the query to the second collection.

10. The method of claim 1, wherein the automatic updating of a collection with a particular query is only performed when the level of relatedness between the collection and the particular query exceeds the threshold value, the method further comprising:

determining, for each respective collection of the plurality of collections other than the particular collection, that the query is not common among the queries of the plurality of visualizations of queries in the respective collection, and therefore that respective levels of relatedness between the query and each of the plurality of collections other than the particular collection do not exceed the threshold value.

11. A system comprising:

a non-transitory memory storing a plurality of collections of visualizations of queries, each of the plurality of collections of visualizations of queries comprising a plurality of visualizations of queries, each of the plurality of visualizations of queries being formed from a query comprising a plurality of semantic classes, attributes, or attribute aggregations;

control circuitry configured to:

determine that a first semantic class, attribute, or attribute aggregation is common among queries of the plurality of visualizations of queries in each of the plurality of collections;

determine that a second semantic class, attribute, or attribute aggregation is common among queries of a plurality of visualizations of queries in a particular collection, but not common among the queries of the plurality of visualizations of queries in each of the plurality of collections;

networking circuitry configured to:

receive a user interface input to generate a new visualization of a query, the query comprising:

the first semantic class, attribute, or attribute aggregation that is common among queries of the plurality of visualizations of queries in each of the plurality of collections; and the second semantic class, attribute, or attribute aggregation that is common among queries of the plurality of visualizations of queries in the particular collection, but not common among the queries of the plurality of visualizations of queries in each of the plurality of collections;

based on the received user interface input, cause display of the new visualization of the query on a graphical user interface;

wherein the control circuitry is further configured to:
determine that the query comprises the second semantic class, attribute, or attribute aggregation that is common among the queries of the particular collection, but not common among the queries of the plurality of visualizations of queries in each of the plurality of collections;

in response to the determination by the control circuitry that the query comprises the second semantic class, attribute, or attribute aggregation that is common among the queries of the particular collection, but not common among the queries of the plurality of visualizations of queries in each of the plurality of collections:
determine that a level of relatedness between the query and the particular collection exceeds a threshold value;
automatically, without receiving further user interface input, modify the plurality of collections of visualizations of queries stored in the non-transitory memory by:
updating the particular collection by adding the new visualization of the query to the plurality of visualizations of queries in the particular collection, wherein the automatic updating of the particular collection is performed further in response to determining that the level of relatedness between the query and the particular collection exceeds the threshold value;

wherein the networking circuitry is further configured to:
receive a request to display the plurality of visualizations of the queries of the updated particular collection; and
in response to receiving the request, cause display on the graphical user interface of the updated particular collection including the new visualization of the query.

12. The system of claim 11, wherein, when determining that the second semantic class, attribute, or attribute aggregation is not common among the queries of the plurality of visualizations of queries of each of the plurality of collections, the control circuitry is further configured to determine that a frequency of occurrence of the second semantic class, attribute, or attribute aggregation in the queries of the plurality of visualizations of queries of each of the plurality of collections is lower than a threshold frequency value.

13. The system of claim 11, wherein, when determining that the second semantic class, attribute, or attribute aggregation is common among the queries of the plurality of visualizations of queries of the particular collection, the control circuitry is further configured to determine that a frequency of occurrence of the second semantic class, attribute, or attribute aggregation in the queries of the plurality of visualizations of queries of the particular collection is greater than a threshold frequency value.

14. The system of claim 11,
wherein the particular collection is a first collection;
wherein the graphical user interface is a first graphical user interface;
wherein the control circuitry is further configured to determine that the new visualization of the query is related to a second collection of visualizations based, at least in part, on one or more visualizations of the second collection being formed from a query that includes the second semantic class, attribute, or attribute aggregation;

wherein the networking circuitry is further configured to:
while the updated particular collection including the new visualization is displayed on the first graphical user interface, receive a user interface input selecting the new visualization of the query;
in response to receiving the user interface input selecting the new visualization, cause display of an identifier of the second collection;
receive a user interface input selecting the identifier of the second collection; and
in response to receiving the user interface input selecting the identifier of the second collection, cause display of a second graphical user interface comprising the one or more visualizations of the second collection.

15. The system of claim 11,
wherein the graphical user interface is a first graphical user interface;
wherein the control circuitry is further configured to determine that the new visualization of the query is related to a particular plurality of queries based, at least in part, on each of the particular plurality of queries including the second semantic class, attribute, or attribute aggregation;
wherein the networking circuitry is further configured to:
while the updated particular collection including the new visualization of the query is displayed on the first graphical user interface, receive a user interface input selecting the new visualization of the query; and
in response to receiving the user interface input selecting the new visualization, cause display of a second graphical user interface comprising a plurality of visualizations formed from the particular plurality of queries.

16. The system of claim 15, wherein the networking circuitry is further configured to:
cause display of, on the second graphical user interface, an option to generate a new collection from the plurality of visualizations formed from the particular plurality of queries; and
receive a user interface input selecting the option to generate the new collection and, in response, store, in the non-transitory memory, data identifying the plurality of visualizations formed from the particular plurality of queries as part of the new collection.

17. The system of claim 16, wherein the option to generate the new collection includes one or more options to add visualizations from other collections to the new collection and one or more options to remove visualizations from the new collection.

18. The system of claim 11,
wherein the control circuitry is further configured to determine that the new visualization of the query is related to a visualization of a particular query based, at least in part, on the particular query including the second semantic class, attribute, or attribute aggregation;
wherein the networking circuitry is further configured to:
while the updated particular collection including the new visualization of the query is displayed on the graphical user interface, receive a user interface input selecting the new visualization of the query;

in response to receiving the user interface input selecting the new visualization, cause display of the visualization of the particular query; and receive a user interface input selecting the visualization of the particular query and, in response, further update the updated particular collection to include the visualization of the particular query and cause display on the graphical user interface of the further updated particular collection including the visualization of the particular query and the new visualization of the query.

19. The system of claim 11, wherein:

the particular collection is a first collection;

the control circuitry is configured to determine that the level of relatedness between the query and the particular collection exceeds the threshold value by computing a level of relatedness of the new visualization of the query to the particular collection; and the control circuitry is further configured to:

compute a level of relatedness of the new visualization of the query to a second collection; and prioritize the adding of the new visualization of the query to the particular collection over adding the new visualization of the query to the second collection in response to determining that the level of relatedness of the new visualization of the query to the particular collection is greater than the level of relatedness of the new visualization of the query to the second collection.

20. The system of claim 11, wherein the automatic updating of a collection with a particular query is only performed when the level of relatedness between the collection and the particular query exceeds the threshold value, and the control circuitry is further configured to:

determine, for each respective collection of the plurality of collections other than the particular collection, that the query is not common among the queries of the plurality of visualizations of queries in the respective collection, and therefore that respective levels of relatedness between the query and each of the plurality of collections other than the particular collection do not exceed the threshold value.

* * * * *